United States Patent
Melodia et al.

(10) Patent No.: US 11,832,103 B2
(45) Date of Patent: Nov. 28, 2023

(54) NEURAL NETWORK FOR ADVERSARIAL DEEP LEARNING IN WIRELESS SYSTEMS

(71) Applicant: Northeastern University, Boston, MA (US)

(72) Inventors: Tommaso Melodia, Newton, MA (US); Francesco Restuccia, Boston, MA (US); Salvatore D'Oro, Allston, MA (US)

(73) Assignee: Northeastern University, Boston, MA (US)

( * ) Notice: Subject to any disclaimer, the term of this patent is extended or adjusted under 35 U.S.C. 154(b) by 528 days.

(21) Appl. No.: 17/128,437

(22) Filed: Dec. 21, 2020

(65) Prior Publication Data

US 2023/0156473 A1    May 18, 2023

Related U.S. Application Data

(60) Provisional application No. 62/952,629, filed on Dec. 23, 2019.

(51) Int. Cl.
  *H04L 29/06*      (2006.01)
  *H04W 12/122*   (2021.01)
  *H04L 41/16*     (2022.01)

(52) U.S. Cl.
  CPC .......... *H04W 12/122* (2021.01); *H04L 41/16* (2013.01)

(58) Field of Classification Search
  CPC . H04W 12/122; H04W 12/12; H04W 12/121; H04W 12/79; H04L 41/16
  See application file for complete search history.

(56) References Cited

U.S. PATENT DOCUMENTS

| | | | | |
|---|---|---|---|---|
| 2015/0312766 | A1* | 10/2015 | Teeni | H04W 12/12 455/411 |
| 2016/0269902 | A1* | 9/2016 | Peng | H04W 12/08 |
| 2017/0033833 | A1* | 2/2017 | Terry | H04W 12/062 |
| 2019/0357051 | A1* | 11/2019 | El Assaad | G01S 3/42 |

OTHER PUBLICATIONS

Cakir et al., "Polyphonic sound event detection using multi label deep neural networks", 2015 International Joint Conference on Neural Networks (IJCNN), Date of Conference: Jul. 12-17, 2015.*
Bair et al., "On the Limitations of Targeted Adversarial Evasion Attacks Against Deep Learning Enabled Modulation Recognition." in Proceedings of the ACM Workshop on Wireless Security and Machine Learning, Miami, FL, USA, May 15-19, 2019 (WiseML 2019); pp. 25-30; doi.org/10.1145/3324921.3328785.
LeCun et al., "Deep learning." Nature, vol. 521, 7553, May 28, 2015, pp. 436-444; doi.10.1038/nature14539.

(Continued)

*Primary Examiner* — Morshed Mehedi
(74) *Attorney, Agent, or Firm* — Verrill Dana, LLP

(57) ABSTRACT

A method of determining a response of a radio frequency wireless communication system to an adversarial attack is provided. Adversarial signals from an adversarial node are transmitted to confuse a target neural network of the communication system. An accuracy of classification of the incoming signals by the target neural network is determined.

21 Claims, 13 Drawing Sheets

(56) References Cited

OTHER PUBLICATIONS

Zhang et al., "ReLeS: a Neural Adaptive Multipath Scheduler based on Deep Reinforcement Learning." Proceedings of the IEEE Conference on Computer Communications (INFOCOM); 2019; pp. 1648-1656.

Shi et al., "Generative Adversarial Network for Wireless Signal Spoofing." in Proceedings of the ACM Workshop on Wireless Security and Machine Learning (WiseML 2019). ACM, New York, NY, USA, pp. 55-60; arXiv:1905.01008v2 [eess.SP] May 7, 2019; doi.org/10.1145/3324921.3329695.

D'Oro et al., "Optimal Power Allocation and Scheduling Under Jamming Attacks." IEEE/ACM Transactions on Networking 25, 3; 2016, 14 pages.

Jagannath et al., "Machine Learning for Wireless Communications in the Internet of Things: A Comprehensive Survey." Ad Hoc Networks 93; 2019; 46 pages.

Restuccia et al., "Big Data Goes Small: Real-time Spectrum-Driven Embedded Wireless Networking through Deep Learning in the RF Loop." in Proceedings of the IEEE Conference on Computer Communications (INFOCOM). arXiv:1903.05460v1 [cs.NI] Mar. 12, 2019; 10 pages.

Restuccia et al., "DeepRadioID: Real-Time Channel-Resilient Optimization of Deep Learning-based Radio Fingerprinting Algorithms." Proc. of ACM International Symposium on Mobile Ad Hoc Networking and Computing (MobiHoc) (2019). arXiv:1904:07623v1 [cs.NI] Apr. 16, 2019; 10 pages.

Restuccia et al., "Securing the Internet of Things in the Age of Machine Learning and Software-Defined Networking." IEEE Internet of Things Journal vol. 1, No. 1; Jan. 2018; 14 pages; arXiv:1803.05022v2 [cs.CR] Jun. 11, 2018; doi.org/10.1109/JIOT.2018.2846040.

Riyaz et al., "Deep Learning Convolutional Neural Networks for Radio Identification." IEEE Communications Magazine 56, 9 (Sep. 2018), 7 pages; doi.org/10.1109/MCOM.2018.1800153.

Restuccia et al., "Hacking the Waveform: Generalized Wireless Adversarial Deep Learning." IEEE Transactions on Wireless Communication; 30 pages; arXiv:2005.02270v1 [cs.NI] May 5, 2020.

Carlini et al., "Towards Evaluating the Robustness of Neural Networks." In IEEE Symposium on Security and Privacy (S&P); 2017; 19 pages; arXiv:1608.04644v2 [cs.CR] Mar. 22, 2017; doi.org/10.1109/SP.2017.49.

Goodfellow et al., "Explaining and Harnessing Adversarial Examples." In Proceedings of the International Conference on Learning Representations (ICLR). arXiv:1412.6572v3 [stat.ML] Mar. 20, 2015; 11 pages.

Moosavi-Dezfooli et al., "Universal Adversarial Perturbations." In Proceedings of the IEEE Conference on Computer Vision and Pattern Recognition (CVPR); 2017; pp. 1765-1773.

O'Shea et al., "End-to-End Radio Traffic Sequence Recognition with Recurrent Neural Networks." In Proceedings of the IEEE Global Conference on Signal and Information Processing (GlobalSIP). IEEE, 8 pages; arXiv:1610.00564v1 [cs.LG] Oct. 3, 2016.

O'Shea et al., "Over-the-Air Deep Learning Based Radio Signal Classification." IEEE Journal of Selected Topics in Signal Processing, vol. 12, No. 1 (Feb. 2018), pp. 168-179. https://doi.org/10.1109/JSTSP.2018.2797022.

Papernot et al., "Practical Black-Box Attacks against Machine Learning." In Proceedings of the 2017 ACM on Asia Conference on Computer and Communications Security (Asia CCS '17); Apr. 2-6, 2017; Abu Dhabi, United Arab Emirates; arXiv:1602.02697v4 [cs.CR] Mar. 19, 2017; 14 pages; doi.org/10.1145/3052973.3053009.

\* cited by examiner

*FIG. 13(a)*

| 5 Taps,ε=0.1 | | | | |
|---|---|---|---|---|
| 0 | 0 | 0 | 0 | 0 |
| 100 | 100 | 100 | 100 | 100 |
| 0 | 0 | 0 | 0 | 0 |
| 0 | 0 | 0 | 0 | 0 |
| 0 | 0 | 0 | 0 | 0 |

*FIG. 13(b)*

| 5 Taps,ε=1 | | | | |
|---|---|---|---|---|
| 4 | 0 | 75 | 2 | 100 |
| 0 | 0 | 1 | 88 | 0 |
| 0 | 0 | 15 | 0 | 0 |
| 0 | 100 | 9 | 12 | 0 |
| 93 | 0 | 0 | 0 | 0 |

*FIG. 13(c)*

| 20 Taps,ε=10 | | | | |
|---|---|---|---|---|
| 4 | 0 | 1 | 2 | 100 |
| 0 | 0 | 0 | 94 | 0 |
| 0 | 0 | 97 | 0 | 0 |
| 0 | 100 | 2 | 4 | 0 |
| 96 | 0 | 0 | 0 | 0 |

NEURAL NETWORK FOR ADVERSARIAL DEEP LEARNING IN WIRELESS SYSTEMS

CROSS REFERENCE TO RELATED APPLICATIONS

This application claims priority under 35 U.S.C. § 119(e) of U.S. Provisional Application No. 62/952,629, filed on 23 Dec. 2019, entitled "Neural Network for Adversarial Deep Learning in Wireless Systems," the disclosure of which is hereby incorporated by reference.

STATEMENT REGARDING FEDERALLY SPONSORED RESEARCH OR DEVELOPMENT

This invention was made with government support under Grant Number N00164-18-R-WQ80 awarded by DARPA. The government has certain rights in the invention.

BACKGROUND

Radio frequency (RF) wireless communication systems are becoming more complex and are employing data-driven solutions based on deep learning to solve classification problems where a closed-form mathematical model is too cumbersome or even impossible to obtain. Neural networks are now being used to address notoriously hard problems such as radio fingerprinting, signal/traffic classification, and resource allocation, among many others. Yet, extensive work in computer vision has demonstrated that carefully tailored adversarial inputs can seriously decrease the accuracy of a deep learning model. On the other hand, it is unclear if, when, and how adversarial machine learning (AML) is concretely possible in practical wireless scenarios, where (i) the highly time-varying nature of the channel could compromise adversarial attempts; and (ii) the received waveforms still need to be decodable and thus cannot be extensively modified.

SUMMARY

The technology described herein provides a comprehensive, general-purpose modeling, analysis and experimental evaluation of adversarial attacks to machine learning models in the wireless domain. A Generalized Wireless Adversarial Machine Learning Problem (GWAP) is provided to address AML in the wireless domain. Algorithms are provided to solve the GWAP in whitebox and blackbox settings. The performance of the algorithms has been evaluated on existing state-of-the-art neural networks and datasets. Results demonstrate that the algorithms were effective in confusing the classifiers while keeping the waveform distortion to a minimum.

DESCRIPTION OF THE DRAWINGS

FIGS. 13(a)-13(c) are graphs illustrating WaveNet fooling matrices with 1 FIRLayer and different number of taps and c value.

DETAILED DESCRIPTION

Figures 1A, 1B, 1C, 1D:
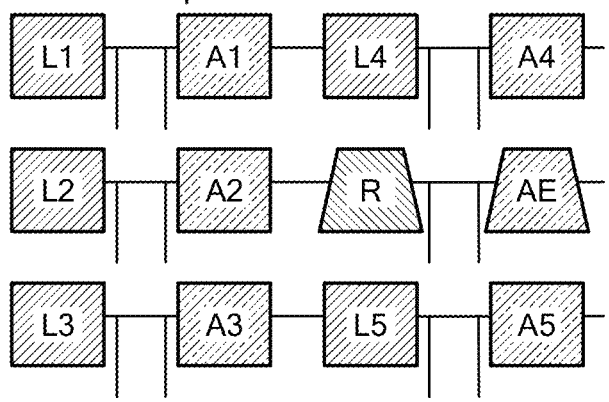
FIGS. 1(a)-1(d) are illustrations that simple attacks may not hack a wireless classifier.

Recent research has shown that deep learning can classify spectrum phenomena with accuracy levels that were once thought impossible. Yet, extensive work in computer vision has demonstrated that carefully tailored adversarial inputs can seriously decrease the accuracy of a deep learning model. On the other hand, it is unclear if, when, and how adversarial machine learning (AML) is concretely possible in practical wireless scenarios, where (i) the highly time-varying nature of the channel could compromise adversarial attempts; and (ii) the received waveforms still need to be decodable and thus cannot be extensively modified. The technology described herein bridges the gap between AML and the wireless domain by providing a comprehensive analysis and experimental evaluation of adversarial learning attacks to state-of-the-art wireless deep learning systems. First, a series of adversarial attacks are postulated, and a Generalized Wireless Adversarial Machine Learning Problem (GWAP) is mathematically formulated which analyzes the combined effect of the wireless channel and the adversarial waveform on the efficacy of the attacks. The technology provides algorithms to solve the GWAP in (i) a "white box" setting where the adversary has access to the deep learning model; and (ii) a "black box" setting where the deep learning model is not available. For the latter, a neural network architecture is provided, sometimes termed "WaveNet" herein, which combines concepts from deep learning and signal processing to "hack" a classifier based only on its output. The performance of the algorithms has been evaluated on classifiers trained on (i) a 1,000-device radio fingerprinting dataset, and (ii) a 24-class modulation dataset. Results obtained with several channel conditions show that the white-box algorithms can decrease the classifier accuracy up to 3×. The adversarial neural network technology has also been experimentally evaluated on a software-defined radio testbed, which showed that the data-driven black-box approach can confuse the classifier up to 97% while keeping the waveform distortion to a minimum.

The technology provides advantages in Internet of Things security applications and markets, and in military and/or tactical wireless systems security. The technology provides wireless adversarial machine learning algorithms suitable for use with real-world datasets and models. The technology provides a neural network implementation of digital signal processing. The technology provides an experimental evaluation of wireless adversarial machine learning. The technology enables machine learning modes to be more robust in the wireless domain. The technology enables tactical applications, such as cracking radio fingerprinting and modulation recognition.

1. Introduction

The Internet of Things (IoT) will bring 75.44B devices on the market by 2025, a 5× increase in ten years. Due to the sheer number of IoT devices soon to be deployed worldwide, the design of practical spectrum knowledge extraction techniques has now become a compelling necessity—not only to understand in real time the wireless environment, but also to design reactive, intelligent, and more secure wireless protocols, systems, and architectures.

Arguably, the radio frequency (RF) spectrum is one of nature's most complex phenomena. For this reason, data-driven solutions based on deep learning are well suited to solve classification problems where a closed-form mathematical model is too cumbersome or even impossible to obtain. Neural networks are now being used to address notoriously hard problems such as radio fingerprinting, signal/traffic classification, and resource allocation, among many others.

However, neural networks are prone to be "hacked" by carefully crafting small-scale perturbations to the input—which keep the input similar to the original one, but are ultimately able to "steer" the neural network away from the ground truth. This activity is also known as adversarial machine learning (AML). The degree to which malicious wireless agents can find adversarial examples is correlated to the applicability of neural networks to problems in the wireless domain. For example, if neural networks are used in tactical or highly-pervasive IoT contexts, AML could potentially disrupt communications or cause life-threatening situations.

The above reasons show the timeliness and usefulness of an investigation into the robustness of wireless deep learning systems. Prior work is limited by small-scale simulation-based scenarios. A reason that sets wireless AML apart is that a wireless deep learning system is by definition non-stationary, due to the time-varying nature of the channel. This implies that the channel action should be factored into the crafting process of the AML attack.

To further confirm this aspect, FIG. 1 reports a series of experimental results obtained with the software-defined radio testbed (described in Section 6.4 below). In this setup shown in FIG. 1($d$), a series of waveforms coming from five legitimate transmitters (L1 to L5) through a legitimate receiver (R) were collected. Then, a neural network was trained (see Section 6.4 below) to recognize the legitimate devices by learning the unique impairments imposed by the radio circuitry on the transmitted waveforms, also called radio fingerprinting. The neural network obtained 59% accuracy, as shown in FIG. 1($a$). An adversarial eavesdropper radio (AE) was used to record the waveforms transmitted by the legitimate transmitters. The fooling rate obtained by five adversarial devices A1 to A5, which try to imitate respectively L1 to L5 by (i) transmitting their own waveforms—is shown in FIG. 1($b$); and (ii) "replaying" the recorded waveforms from L1 to L5—shown in FIG. 1($c$). FIG. 1($b$) shows that when A1 to A5 transmitted their own waveforms, the fooling rate was 20%, lower than the original accuracy of 59%. However, FIG. 1($c$) indicates that the fooling rate was only 30% when A1 to A5 replayed the eavesdropped waveforms, suggesting that the channel was making the attack less effective. Thus, more complex attacks can be designed and tested to validate whether AML is effectively a threat in the wireless domain.

The technology described herein provides a comprehensive modeling and experimental evaluation of adversarial machine learning (AML) attacks to wireless deep learning systems. To this end, the technology bridges together concepts from both the wireless and the adversarial learning domains, which have been so far kept substantially separated.

An AML threat model (Section 2) is provided which considers (i) a "whitebox" scenario, where the adversary has complete access to the neural network; and (ii) a "blackbox" scenario, where the neural network is not available. In the model, attacks are derived for arbitrary channels, waveforms, and neural networks, and thus generalizable to any state-of-the-art wireless deep learning system.

Based on the model, a AML Waveform Jamming (Section 3.1) and a AML Waveform Synthesis (Section 3.2) attack are formulated. A Generalized Wireless Adversarial Machine Learning Problem (GWAP) is provided where an adversary aims to steer the neural network away from the ground truth yet keeping constraints such as bit error rate, energy emitted, and other relevant metrics below a threshold (Section 4). In Section 4.2, a gradient-based algorithm is provided to solve the GWAP in a white-box scenario. For the blackbox scenario, a neural network architecture, called WaveNet, is provided. The approach mixes together concepts from generative adversarial learning and signal processing to train a neural network composed by finite impulse response layers (FIRLayers).

The algorithms are evaluated on (i) a deep learning model for radio fingerprinting trained on a 10,000-device dataset of WiFi and ADS-B transmissions collected in the wild; and (ii) a modulation recognition model trained on the RadioML 2018.01A dataset, which includes 24 different analog and digital modulations with different levels of signal-to-noise ratio (SNR). Extensive experimental results indicate that the algorithms can decrease the accuracy of the models up to 3× in case of whitebox attacks, while keeping the waveform distortion to a minimum. The adversarial neural network (WaveNet) approach is evaluated on the software-defined radio testbed, which shows that the approach confuses the 5-device radio fingerprinting classifier up to 97%.

2. Modeling Wireless AML

As used herein, boldface upper and lower-case letters denote matrices and column vectors, respectively. For a vector x, $x_i$ denotes the i-th element, $\|x\|_p$ indicates the lp-norm of x, $x^T$ its transpose, and x·y the inner product of x and y. For a matrix H, Hij indicates the (i,j)-th element of H. The notation $\mathbb{R}$ and $\mathbb{C}$ indicates the set of real and complex numbers, respectively.

Figure 2:
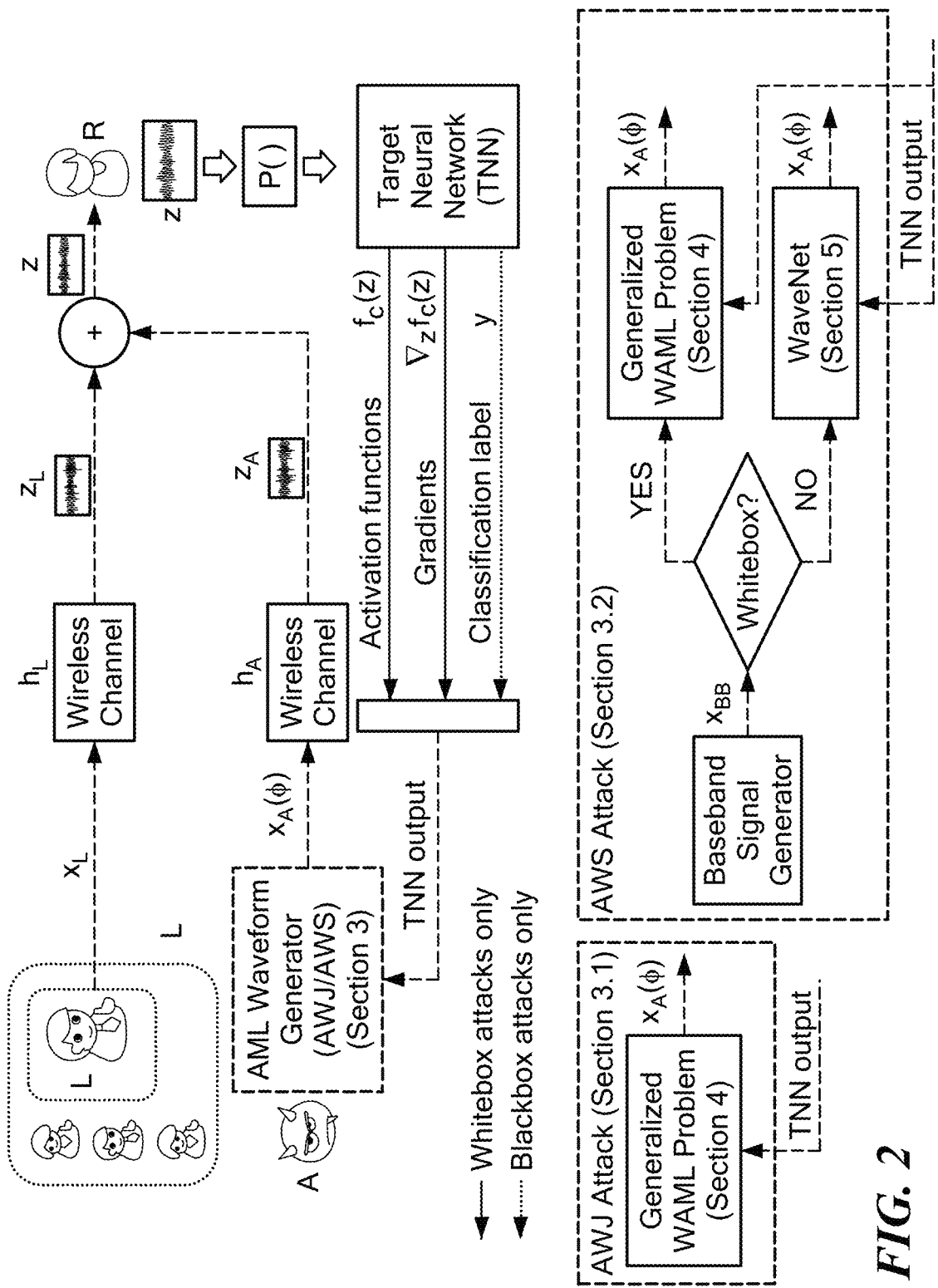
FIG. 2 is an illustration of a system model and overview of AML Waveform Jamming (AWJ) and AML Waveform Synthesis (AWS).

System Model. The top portion of FIG. 2 summarizes the system model, where a receiving node R, an attacker node A, and a set $\mathcal{L}$ of N legitimate nodes communicating with R, are considered. It is assumed that R hosts a target neural network (TNN) used to classify waveforms coming from nodes in $\mathcal{L}$.

Let $\Lambda>1$ be the number of layers of the TNN, and C be the set of its classes. The TNN is modeled as a function F that maps the relation between a set of inputs X and a set of outputs Y through a Λ-layer mapping $F(x; \theta): \mathbb{R}^i \to \mathbb{R}^o$ of an input vector $x \in \mathbb{R}^i$ to an output vector $y \in \mathbb{R}^o$. The mapping happens through Λ transformations:

$$r_j = F_j(r_{j-1}, \theta_j) \quad 0 \leq j \leq \Lambda, \tag{1}$$

where $F_j(r_{j-1}, \theta_j)$ is the mapping carried out by the j-th layer. The vector $\theta=(\theta_1, \ldots, \theta_\Lambda)$ defines the whole set of parameters of the TNN. It is assumed the last layer of the TNN is dense, meaning that $F_{\Lambda-1}(r_{j-1}, \theta_j) = \sigma(W_j \cdot r_{j-1} + b_j)$, where σ is a softmax activation function, $W_j$ is the weight matrix and $b_j$ is the bias vector.

The activation probabilities of the neurons at the last layer of the TNN are evaluated. Let $c \in C$ be a generic class in the classification set of the TNN. Let $f_c(x)$ denote the activation probability of the neuron corresponding to class c at the output layer of the TNN when input x is fed to the TNN. From (1), it follows that $$f_c(x) = F_{\Lambda,c}(r_{\Lambda-1}, \theta_\Lambda). \tag{2}$$

It is assumed that the input of the TNN is a series of I/Q samples received from the radio interface. For the sake of generality, it is assumed that the I/Q samples may be processed through a processing function P( ) before feeding the I/Q samples to the TNN. Common examples of processing functions P( ) are equalization, demodulation or packet detection.

Threat Model. It is assumed that the adversary A may or may not be part of the legitimate set of nodes in $\mathcal{L}$. The adversary is called respectively rogue and external in these cases. Adversarial action is further classified based on the knowledge that the adversary possesses regarding the TNN. In the first, called whitebox, adversary A has perfect knowledge of the TNN activation functions $F_j$, meaning that A has access not only to the output layer $F_\Lambda$ but also to the weight vector θ (and thus, its gradient as a function of the input).

In the second scenario, also called blackbox, the adversary does not have full knowledge of the TNN, and therefore cannot access gradients. It is assumed, however, that the adversary has access to the output of the TNN. Specifically, for any arbitrarily chosen waveform x, the adversary can obtain its label C(x)=y by querying the TNN. Obtaining the output of the TNN is an issue known as 1-bit feedback learning. In this scenario, the adversary can use ACKs or REQs as 1-bit feedback. Specifically, for a given batch B of size M, the loss function L(B) can be approximated by observing the number of ACKs or REQs received (A) for the current batch and then assign $$L(B) = \frac{M-A}{M}.$$

The adversary then may choose different strategies to craft adversarial samples over tuples (x, y) obtained from querying the TNN. The technology considers herein targeted and untargeted attacks. The former type attempts to find waveforms that make the classifier "steer" toward a different class than the ground truth g. More formally, given a classifier C and a target t, the adversary tries to find a waveform w~x such that C(w)=t≠g. Conversely, untargeted attacks attempt to find waveforms through which C(w)≠C(x).

Wireless Model. To be effective, the attacker must be within the transmission range of R, meaning that A should be sufficiently close to R to emit waveforms that compromise (to some extent) ongoing transmissions between any node $l \in \mathcal{L}$ and R. In this scenario, not only can A eavesdrop wireless transmissions generated by R (e.g., feedback information such as ACKs or REQs), but can also emit waveforms that can be received by R—and thus, compromise the TNN.

The effect of channel action is illustrated in FIG. 2, which can be expressed through models for wireless networks. Specifically, the waveform transmitted by any legitimate node $L \in \mathcal{L}$ and received by R can be modeled as $$z_L = x_L \circledast h_L + w_L, \tag{3}$$

where $x_L$ represents the waveform transmitted by node L, ⊛ is the convolution operator; $h_L$ and $w_L$ are the fading and noise characterizing the channel between node L and the receiver R.

Similarly, let $x_A$ be the waveform transmitted by node A, and let φ be an attack strategy of A. The attacker utilizes φ to transform the waveform $x_A$ and its I/Q samples. For this reason, the waveform transmitted by A can be written as $x_A(\phi)$. For the sake of generality, in this section no assumption are made on φ. However, in Section 3, two examples of practical relevance (i.e., jamming and waveform synthesis) are presented where closed-form expressions for the attack strategy φ and $x_A(\phi)$ are derived. The waveform $z_A$ received by node R can be written as $$z_A = x_A(\phi) \circledast h_A + w_A. \tag{4}$$

Notice that (3) and (4) do not assume any particular channel model, nor any particular attack strategy. Therefore, the formulation is general in nature and able to model a rich set of real-world wireless scenarios.

In most wireless applications, noise $w_i$ can be modeled as additive white Gaussian (AWGN). On the contrary, $h_i$ depends on mobility, multi-path and interference. Although these aspects depend on the application and network scenarios, they are usually assumed to be constant within the coherence time of the channel, thus allowing to model $h_i$ as a Finite Impulse Response (FIR) filter with K>0 complex-valued taps.

By leveraging the above properties, the n-th component $z_i[n]$ of the waveform $z_i$ received from node i can be written as follows:

$$z_i[n] = \sum_{k=0}^{K-1} h_{i_k}[n] x_i[n-k] + w_i[n] \tag{5}$$

where $x_i[n]$ is the n-th I/Q symbol transmitted by node i; $h_{ik}[n]$ and $w_i[n]$ are respectively the k-th complex-valued FIR tap and noise coefficients representing the channel effect at time instant n.

3. Wireless AML Attacks

Referring to FIG. 2, AAA Waveform Jamming (Section 3.1) and AML Waveform Synthesis (Section 3.2) are introduced.

3.1 AML Waveform Jamming (AWJ)

In AWJ, an adversary carefully jams the waveform of a legitimate device to confuse the TNN. Since the TNN takes as input I/Q samples, the adversary may craft a waveform to cause a slight displacement of I/Q samples at the receiver side, thus fooling the TNN.

As shown in FIG. 2, the waveform $x_A$ generated by the attacker node A is aimed at jamming already ongoing transmissions between a legitimate node L and the receiver R. In this case, the signal received by R can be written as $$z = z_A + z_L \tag{6}$$

where $z_A$ and $z_L$ are defined in (3) and (4), respectively.

Attack objectives and strategies. The attacker aims at computing $x_A$ so that $C(z) \neq C(z_L)$. Moreover, this attack can be either targeted (i.e., A generates jamming waveforms whose superimposition with legitimate signals produce $C(z) = c_T$, with $c_T$ being a specific target class in C), or untargeted (i.e., it is sufficient to obtain $C(z) \neq c_L$).

In this case, $x_A(\phi) = \phi$. That is, the transmitted waveform corresponds to the actual attack (jamming) strategy. Specifically:

$$x_A(\phi) = (\phi_n^{\Re} + j\phi_n^{\Im})_{n=1,\ldots,N_J}. \quad (7)$$

where (i) $a^{\Im} = \mathrm{Im}(a)$ and $a^{\Re} = \mathrm{Re}(a)$ for any complex number a; and (ii) $N_J > 1$ represents the length of the jamming signal in terms of I/Q samples. Since $N_J$ might be smaller than the TNN input $N_I$, without losing in generality, it can be assumed that that adversary periodically transmits the sequence of $N_J$ I/Q samples so that they completely overlap with legitimate waveforms and have the same length, i.e., $N_J = N_I$. However, it can be noticed that perfect superimposition of the jamming signal with the legitimate signal is not assumed, and thus adversarial signals are not added in a precise way to the legitimate waveform.

Undetectability aspects. Any invasive attack might reveal the presence of the adversary to the legitimate nodes, which will promptly implement defense strategies. For this reason, the adversary generates misclassifications with undetectability by computing $\phi$ such that the signal z can still be decoded successfully by the receiver (e.g., by keeping the bit-error-rate (BER) lower than a desirable threshold) but yet misclassified. This is because the attacker aims to conceal its presence. If exposed, the receiver might switch to another frequency, or change location, thus making attacks less effective. However, this constraint can be relaxed if the jammer is not concerned about concealing its presence. It can be further assumed that the attacker has no control over channel conditions (i.e., $h_A$ and $w_A$) and legitimate signals (i.e., $z_L$), meaning that the attacker can control $x_A(\phi)$ only by computing effective attack strategies $\phi$.

Addressing non-stationarity. An adversary cannot evaluate the channel $h_L$ in (3)—which is node-specific and time-varying. Also, waveforms transmitted by legitimate nodes vary according to the encoded information, which is usually a non-stationary process. It follows that jamming waveforms that work well for a given legitimate waveform $z_L$ might not be equally effective for any other $z'_L \neq z_L$. Thus, rather than computing the optimal jamming waveform for each specific legitimate signal $z_L$, it is computed over a set of consecutive S legitimate input waveforms, also called slices.

Let $\rho \in \{0, 1\}$ be a binary variable to indicate whether or not the attacker node belongs to the legitimate node set $\mathcal{L}$ (i.e., a rogue node). Specifically, $\rho = 1$ if the attacker node is a rogue device and $A \in \mathcal{L}$, $\rho = 0$ if the attacker is external (i.e., $A \notin \mathcal{L}$). Also, let $c_L$ and $c_A$ be the correct classes of the waveforms transmitted by nodes L and A, respectively.

Untargeted AWJ. The adversary aims at jamming legitimate waveforms such that (i) these are misclassified by the TNN; (ii) malicious activities are not detected by the TNN; and (iii) attacks satisfy hardware limitations (e.g., energy should be limited). These objectives and constraints can be formulated through the following untargeted AWJ problem (AWJ-U):

$$\underset{\phi}{\text{minimize}} \quad \frac{1}{S}\sum_{s=1}^{S}[f_{c_L}(z_s) + \rho \cdot f_{c_A}(z_s)] \quad \text{(AWJ-U)}$$

subject to $BER_L(z_s) \leq BER_{max}, s = 1, 2, \ldots, S$ \quad (C1)

$\|x_A(\phi)\|_2^2 \leq E_{max}, s = 1, 2, \ldots, S$ \quad (C2)

where $z_s = z_A + z_{L_s}$, $z_{L_s}$ represents the s-th slice (or input) of the TNN; Constraint (C1) ensures that the BER experienced by the legitimate node is lower than the maximum tolerable BER threshold $BER_{max}$; while (C2) guarantees that the energy of the jamming waveform does not exceed a maximum threshold $E_{max}$. In practice, Constraints (C1) and (C2) ensure that jamming waveforms do not excessively alter the position of legitimate I/Q samples. This is useful to avoid anti-jamming strategies such as modulation and frequency hopping, among others. Although Problem (AWJ-U) takes into account Constraints (C1) and (C2) only, in Section 4 the formulation is extended to larger set of constraints.

Targeted AWJ. By defining $c_T \in C$ as the target class, the targeted AWJ is formulated as $$\underset{\phi}{\text{maximize}} \quad \frac{1}{S}\sum_{s=1}^{S}[f_{c_T}(z_s) - (f_{c_L}(z_s) + \rho \cdot f_{c_A}(z_s))] \quad \text{(AWJ-T)}$$

subject to Constraints (C1), (C2)

When compared to Problem (AWJ-U), Problem (AWJ-T) differs in terms of the objective function. One approach would see the adversary maximize the term $$\frac{1}{S}\sum_{s=1}^{S} f_{c_T}(z_s)$$

only. However, the objective of the adversary is to produce misclassifications, so the adversary should try to reduce the activation probability of the jammed class $c_L$ and adversarial class $c_A$, while maximizing the activation probability for the target class $c_T$. It is expected that the TNN has high accuracy and by simply maximizing $$\frac{1}{S}\sum_{s=1}^{S} f_{c_T}(z_s)$$

does not necessarily mean that the TNN would not be able to still correctly classify transmissions from the legitimate device L (i.e., the activation probability $f_{c_L}$ might still be high).

An example is provided. Assume that the attacker is external $$(\rho = 0), \frac{1}{S}\sum_{s=1}^{S} f_{c_T}(z_{L_s}) = 0.1 \text{ and } \frac{1}{S} f_{c_L}(z_{L_s}) = 0.9.$$

Consider the case where the adversary computes $\phi$ such that the term $$\frac{1}{S}\sum_{s=1}^{S} f_{c_T}(z_s)$$

only is maximized. A reasonable outcome of this optimization problem is that $\phi$ is such that $$\frac{1}{S}\sum_{s=1}^{S} f_{c_T}(z_s) = 0.4 \text{ and } \frac{1}{S}\sum_{s=1}^{S} f_{c_L}(z_s) = 0.6.$$

In this case, it is easy to notice that input waveforms are still classified as belonging to class $c_L$. A similar argument can be made for term $\rho f_A(z_s)$ when $\rho=1$ (i.e., the attacker is a rogue node).

In other words, to effectively fool the TNN, the attacker must generate waveforms that (i) suppress features of class $c_L$; (ii) mimic those of class $c_T$; and (iii) hide features of the attacker's class $c_A$. These objectives can be formulated via the objective function in Problem (AWJ-T).

3.2 AML Waveform Synthesis (AWS)

In this attack—illustrated in the bottom-right side of FIG. 2—an adversary A transmits synthetic waveforms trying to imitate features belonging to a target class $c_T$. In contrast to the AWJ, in this case $z=z_A$, and synthetic waveforms $x_A(\phi)$ are generated so that $C(z)=c_T$ and the waveform received by node R is still intelligible. By definition, this attack is targeted only.

Let $c_T \in C$ be the target class. The (targeted) AWS problem (AWS) is formulated as $$\underset{\phi}{\text{maximize}} \; \frac{1}{S}\sum_{s=1}^{S}[f_{c_T}(z_{A_s}) - \rho f_{c_A}(z_{A_s})] \quad \text{(AWS)}$$

subject to Constraints (C1), (C2)

This attack can map to scenarios such as radio fingerprinting, where a malicious device aims at generating a waveform embedding impairments that are unique to the target legitimate device. In other words, the attacker cannot generate random waveforms as in the AWJ, but should transmit waveforms that contain decodable information. To this end, FIR filters are uniquely positioned to address this issue. More formally, a FIR is described by a finite sequence $\phi$ of M filter taps, i.e., $\phi=(\phi_1, \phi_2, \ldots, \phi_M)$. For any input $x \in X$, the filtered n-th element $\hat{x}[n] \in \hat{x}$ can be written as $$\hat{x}[n] = \sum_{m=0}^{M-1} \phi_m x[n-m] \quad (8)$$

It can be observed that by using FIRs, the adversary can manipulate the position in the complex plane of the transmitted I/Q symbols. By using complex-valued filter taps, i.e., $\phi_m \in \mathbb{C}$ for all $m=0, 1, \ldots, M-1$, Eq. (8) becomes:

$$\hat{x}[n] = \sum_{m=0}^{M-1} (\phi_m^{\Re} + j\phi_m^{\Im})(_x\Re[n-m] + jx^{\Im}[n-m]) \quad (9)$$

$$= \hat{x}^{\Re}[n] + j\hat{x}^{\Im}[n]$$

For example, to rotate all I/Q samples by $\theta=\pi/2$ radians and halve their amplitude, set $\phi_1 = \frac{1}{2}\exp^{j\pi/2}$ and $\phi_k=0$ for all $k>1$. Similarly, other complex manipulations can be obtained by fine-tuning filter taps. It can be seen that complex FIRs can be effectively used by the attacker node to fool the TNN through AWS attacks.

By using a FIR $\phi$ with M complex-valued taps, the waveform $x_A(\phi)$ transmitted by the attacker can be written as $$x_A(\phi) = x_{BB} \circledast \phi \quad (10)$$

where $x_A(\phi) = (x_A[n](\phi))_{n=1,\ldots,N_I}$, $x_A[n](\phi)$ is computed as in (9), $x_{BB} = (x_{BB}[n])_{n=1,\ldots,N_I}$ is an intelligible signal (e.g., a portion of a WiFi packet) and $\phi = (\phi_n^{\Re} + j\phi_n^{\Im})_{n=1,\ldots,N_I}$ is the FIR used to generate a synthetic waveform.

4. Generalized WAML Problem (GWAP)

Notice that Problems (AWJ-U), (AWJ-T) and (AWS) are similar in target. Thus, the following generalized wireless AML problem (GWAP) formulation are proposed:

$$\underset{\phi}{\text{maximize}} \; \sum_{s=1}^{S}\sum_{c \in C} \omega_c f_c(z_s) \quad \text{(GWAP)}$$

subject to $g(z_s) \leq 0, s = 1, \ldots, S$ \quad (11)

where $g(z)=(g_1(z), \ldots, g_G(z))^T$ is a generic set of constraints that reflect BER, energy and any other constraint that the attack strategy $\phi$ must satisfy (e.g., upper and lower bounds); and $\omega_c$ takes values in $\{-\rho, -1, 0, 1, \rho\}$ depending on the considered attack. As an example, Problem (AWJ-T) has $\omega_{c_T}=1$, $\omega_{c_L}=-1$, $\omega_{c_A}=-\rho$ and $\omega_c=0$ for all $c \neq c_L, c_T, c_A$.

Problem (GWAP) is non trivial since (i) the functions $f_c$ have no closed-form and depend on millions of parameters; (ii) both the objective and the constraints are highly non-linear and non-convex; (iii) it is not possible to determine the convexity of the problem. Despite the above challenges, in whitebox attacks the adversary has access to the gradients of the TNN (FIG. 2). In the following, it is shown how an attacker can effectively use gradients to efficiently compute AML attack strategies. Note that the whitebox algorithms, similar to the fast gradient sign method (FGSM), use gradients to generate adversarial outputs. However, FGSM can compute adversarial examples tailored for a specific input and a specific channel condition only. Conversely, as explained above under "Addressing non-stationarity," the algorithms herein take into account multiple inputs to find a single FIR filter that can synthesize adversarial inputs for multiple channel conditions, thus resulting more general and practical than FGSM-based approaches.

From (6), the input of the TNN is $z=z_A+z_L$. Since $z_L$ cannot be controlled by the attacker node, $f_c(z)=f_c(z_A)$. FIG. 2 shows that the TNN provides the gradients $\nabla_z f_c(z)$, hence the attacker can compute the gradients $\nabla_\phi f_c(z)$ of the activation probability corresponding to the c-th class of the TNN with respect to the attacker's strategy $\phi$ by using the chain rule of derivatives. Specifically, the gradients are $$\nabla_\phi f_c(z) = J_\phi(z)^T \cdot \nabla_z f_c(z) \quad (12)$$

where $J_\phi(z)$ is the $N_I \times M$ Jacobian matrix of the input z with respect to the attacker's strategy $\phi$, T is the transposition operator, and $\cdot$ stands for matrix dot product.

The input of the TNN is defined as a set of $N_I$ consecutive I/Q samples, i.e., $z=(z[n])_{n=0,\ldots,N_I-1}$, where $z_n \in \mathbb{C}$ for all $n=0, \ldots, N_I-1$. The attacker's waveform is defined as a sequence of M complex numbers, i.e., $x_A(\phi)=(x_A[m](\phi))_{m=0,\ldots,M-1}$ whose values depend on the attack strategy $\phi$. With this information at hand, it can be observed that the gradient $\nabla_\phi f_c(z)$ has dimension $2M \times 1$, while the gradients with respect to real and imaginary parts of the m-component are respectively $$\frac{\partial f_c(z)}{\partial \phi_m^{\Re}} = \sum_{n=1}^{N_I}\left(\frac{\partial f_c(z)}{\partial z^{\Re}[n]}\frac{\partial z^{\Re}[n]}{\partial \phi_m^{\Re}} + \frac{\partial f_c(z)}{\partial z^{\Im}[n]}\frac{\partial z^{\Im}[n]}{\partial \phi_m^{\Re}}\right) \quad (13)$$

-continued $$\frac{\partial f_c(z)}{\partial \phi_m^{\mathfrak{I}}} = \sum_{n=1}^{N_I}\left(\frac{\partial f_c(z)}{\partial z^{\mathfrak{R}}[n]}\frac{\partial z^{\mathfrak{R}}[n]}{\partial \phi_m^{\mathfrak{I}}} + \frac{\partial f_c(z)}{\partial z^{\mathfrak{I}}[n]}\frac{\partial z^{\mathfrak{I}}[n]}{\partial \phi_m^{\mathfrak{I}}}\right). \quad (14)$$

4.1 Gradients Computation

While the AWJ generates waveforms that mimic noise on the channel and target already ongoing transmissions between legitimate nodes, the AWS aims at creating synthetic waveforms when no other node is occupying the wireless channel. Therefore, the two attacks require different attacks strategies $\phi$ which will inevitably result in different values of (13) and (14). Thus, the implementation details of AWJ and AWS attacks are discussed and the corresponding closed-form expressions for the partial derivatives in (13) and (14) are derived.

AML Waveform Jamming. Here, the adversary is not required to transmit intelligible or standard-compliant waveforms. Therefore, $x_A(\phi)$ is defined in (10). Since is the only variable the attacker can control, $$\frac{\partial z^{Z'}[n]}{\partial \phi_m^{Z''}} = \frac{\partial z^{Z'}[n]}{\partial \phi_m^{Z''}},$$

Where Z' and Z" can be either $\mathfrak{R}$ or $\mathfrak{I}$ to identify real and imaginary part, respectively. Accordingly, from (5):

$$\frac{\partial z^{Z'}[n]}{\partial \phi_m^{Z''}} = h_{A_{n-m}}[n] \quad (15)$$

By substituting (15) into (13) and (14), the attacker can calculate gradients that will be used to compute an efficient jamming solution in Section 4.2.

AML Waveform Synthesis. In this attack, the optimization variables are the FIR taps and the attacker's waveform $x_A(\phi)$ is defined in (10). For this reason, gradients can be computed as follows:

$$\frac{\partial z^{Z'}[n]}{\partial \phi_m^{Z''}} = \sum_{k=0}^{K} h_{A_k}[n]\left(\sum_{m=0}^{M-1} x_{BB}[n-m-k]\right) \quad (16)$$

4.2 Gradient-Based Optimization Algorithm

Presented here is a general solution to Problem GWAP which leverages the availability of gradients (13), (14), (15) and (16) to compute an effective attack strategy $\phi$.

First, the constraints $g_i(\cdot)$ are relaxed through Lagrangian Relaxation. Specifically, the augmented Lagrangian is defined $$L(\phi, \lambda) = \sum_{s=1}^{S}\left(\sum_{c \in C}\omega_c f_c(z_s) - \lambda_s^T g(z_s) - \frac{\rho}{2}\|g(z_s)\|_2^2\right) \quad (17)$$

where $\lambda_s = (\lambda_{0,s}, \ldots, \lambda_{G,s})^T$, $\lambda_{G,s} \geq 0$, $\lambda = (\lambda_1, \ldots, \lambda_s)$, and $\rho > 0$ is a fixed-step size to regulate the convergence speed of the algorithm. By using Lagrangian duality, an approximated solution to Problem (GWAP) can be found by the following iterative process $$\phi^{(t)} = \underset{\phi}{\operatorname{argmax}} L(\phi, \lambda^{(t-1)}) \quad (18)$$

$$\lambda_s^{(t)} = \max\{0, \lambda_s^{(t-1)} + \gamma_t g(z_s)\} \quad (19)$$

where t represents the iteration counter and $\gamma_t$ is a decreasing step-size such that $\Sigma_t \gamma_t = \infty$ and $\Sigma_t \gamma_t^2 < \infty$ Equation (18) can be solved via the Non-linear Conjugate Gradient (NCG) method. To compute a solution at each iteration t, the gradient of $L(\phi, \lambda^{(t-1)})$ is defined as a function of the attack strategy $\phi$:

$$\nabla_\phi L(\phi, \lambda^{(t-1)}) = \sum_{s=1}^{S}\sum_{c \in C}\omega_c \nabla_\phi f_c(z_s) - \lambda_s^{(t-1)\top}\nabla_\phi g(z_s) - \rho J_g^T(\phi) \cdot g(z_s) \quad (20)$$

with $\nabla_\phi f_c(z_s)$ being computed in (12), $\nabla_\phi g(z_s)$ and $J_g^T(\phi)$ being the gradient and Jacobian matrix of the functions g with respect to $\phi$, respectively.

5. Blackbox Optimization: WaveNet

The core objective of the adversarial neural network (WaveNet) is to hack the TNN without requiring to have a copy of the TNN. To this end, the feedback from the TNN is leveraged to carefully transform the input via a series of finite impulse response (FIR) convolutional layers.

Figure 3:
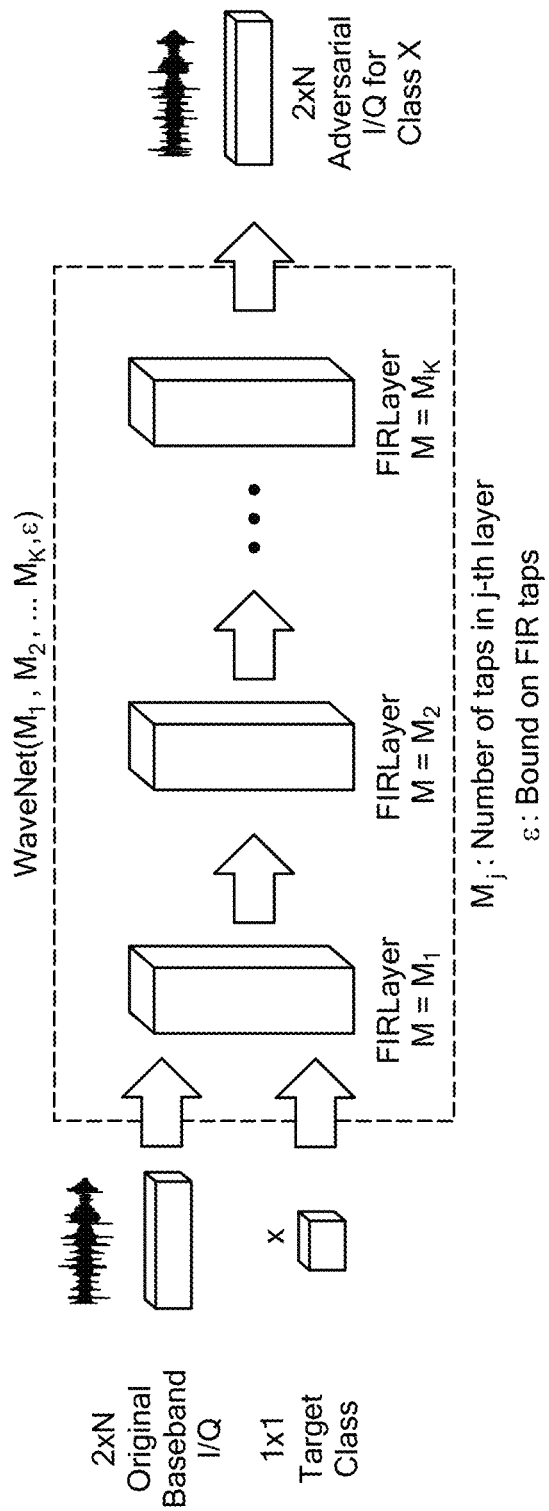
FIG. 3 is an illustration of an adversarial neural network (WaveNet) architecture.

FIG. 3 shows at a high level the architecture of WaveNet. In a nutshell, the ultimate target of the technology is to take as input a number of I/Q samples generated by the adversary's wireless application and a target class and "perturbate" them through a series of consecutive FIRLayers. The FIR operations can be implemented in software and in hardware, making the complexity of technology scalable. Moreover, an FIR can be implemented using one-dimensional (1D) layers in, for example, Keras. Thus, neural network technology is fully GPU-trainable and applicable to many different applications (not necessarily wireless-specific) beside the ones described herein. More formally, by defining $x^R$, $x^I$ the real and imaginary components of an I/Q signal, and $\phi^R$, $\phi^I$ the real and imaginary components if the FIR, an FIR layer manipulates an input as follows:

$$y[n] = \sum_{i=0}^{N-1}(\phi_i^R + j\phi_i^I)(x^R[n-i] + jx^I[n-i]),$$

Before training, the FIR layer's weights are initialized such that $\phi_0 = 1$ and $\{\phi_i\} = 0$, $i > 0$. This initialization in essence represents an identity vector, which returns unchanged input values. The reason this particular initialization rule is considered is to preserve the shape and content of input waveforms in the first few training epochs. This way, the neural network technology updates weights iteratively without irremediably distorting input waveforms.

5.1 Neural Network Technology (WaveNet) Training Process

Generative adversarial networks (GANs) are composed by a generator G and a discriminator D. Both G and D are trained to respectively learn (i) the data distribution and (ii) to distinguish samples that come from the training data rather than G. To this end, the generator builds a mapping function parametrized with $\theta_g$ from a prior noise distribution $p_z$ as $G(z; \theta_g)$, while the discriminator $D(x; \theta_d)$, parametrized with $\theta_g$ parameters, outputs a single scalar representing the probability that x came from the training data distribution $p_x$ rather than the generator G. Therefore, G and D are both trained simultaneously in a minmax problem, where the target is to find the G that minimizes log 1−D(G(z)) and the D that minimizes log D(x). More formally:

$$\min_G \max_D \mathbb{E}_{x \sim p_x} \log(D(x)) + \mathbb{E}_{z \sim p_z} \log(1 - D(G(z)))) \quad (21)$$

Although the neural network technology is at its core an adversarial network, there are a number of key aspects that set the technology apart from existing GANs. First, in this scenario D has already been trained and thus is not subject to any modification during the G training process. Second, GANs assume that D is a binary discriminator (i.e., "fake" vs "authentic" response). This is not the case in this problem, since D has a softmax output (i.e., multiclass). Third, GANs take as input a noise vector, whereas here baseband I/Q samples are taken as inputs. Fourth, as shown in Equation 22, the minmax problem solved by GANs is unconstrained, while the GWAP problem in Section 4 is instead constrained. Fifth, GANs assume stationarity, which is not entirely the case in the wireless domain. Finally, to actually implement a "black-box" attack, it cannot be assumed that the waveform produced by the technology will be used "as is" by the target network, which is instead assumed in traditional GANs.

Figure 4:
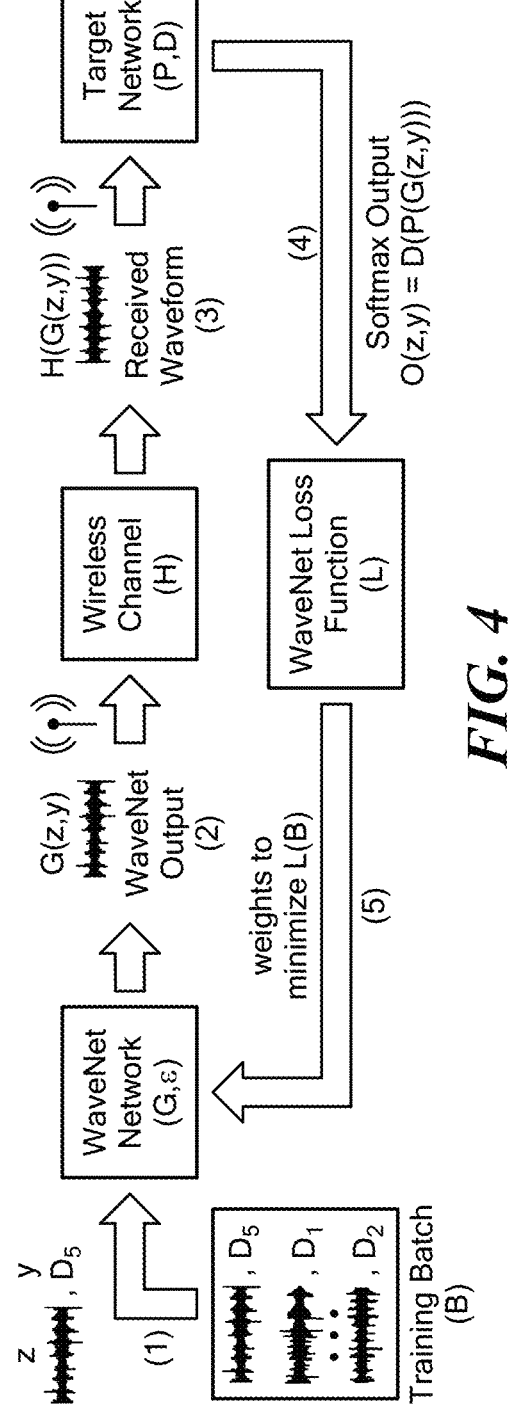
FIG. 4 is an illustration of an adversarial neural network (WaveNet) training loop.

For the above reasons, a training strategy as shown in FIG. 4 is provided. A generator function G is trained able to imitate any device the target network D has been trained to discriminate and with any baseband waveform of interest. To limit the FIR action to a given scope, the constraint (C1) in Problem (AWJ-U) is modeled as a box constraint where each I/Q component of the FIR is constrained within $[-\epsilon, \epsilon]^2$, for any small $\epsilon > 0$.

First, the adversary generates a waveform training batch B (step 1), where waveforms are generated according to the wireless protocol being used. For example, if WiFi is the wireless protocol of choice, each waveform could be the baseband I/Q samples of a WiFi packet that the adversary wants to transmit. To each waveform z in the batch, the adversary assigns an embedded label y, which is selected randomly among the set of devices that the adversary wants to imitate. The adversary does not need to know exactly the number of devices in the network to do this. This set is then fed to the neural network which generates a training output G(z, y, $\epsilon$) (step 2), where $\epsilon$ is the constraint of the weight of the FIRLayers as explained previously.

The waveform produced by the neural network is then transmitted over the air and then received as a waveform H(G(z, y, $\epsilon$)) (step 3). It is realistic to assume that the device could pre-process the waveform before feeding it to the target network, e.g., to extract features in the frequency domain. Thus, the softmax output of the target network is modeled as O(z, y)=D(P(H(G(z, y, $\epsilon$)))). It is assumed that the adversary does not have access in any way to D and P, but only to the softmax output. The adversary can thus minimize the following loss function:

$$L(B) = - \sum_{(z,y) \in B} \sum_{t=1}^{M} \mathbb{I}\{t = y\} \cdot \log(O_t(z, y)) \quad (22)$$

where M is the number of devices, I{·} is a binary indicator function, and $O_t$ is the softmax output for target class t. The adversary can then minimize L(B) using stochastic gradient descent (SGD) or similar algorithms.

The systems and architectures described herein can be implemented in conjunction with a computing device that includes a combination of hardware, software, and firmware that allows the computing device to run an application layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

6. Experimental Results

The datasets and learning architectures are described in Section 6.1, followed by the results of AWF (Section 6.2), AWS (Section 6.3), and the neural network technology (WaveNet) (Section 6.4).

6.1 Datasets and Learning Architectures 6.1.1 Radio Fingerprinting. Considered were (i) a dataset of 500 devices emitting IEEE 802.11a/g (WiFi) transmissions; and (ii) a dataset of 500 airplanes emitting Automatic Dependent Surveillance-Broadcast (ADS-B) beacons. ADS-B is a surveillance transmission where an aircraft determines its position via satellite navigation. For the WiFi dataset, the transmissions were demodulated and the models trained on the derived I/Q samples. To demonstrate the generality of the AML algorithms, the ADSB model was instead trained on the unprocessed I/Q samples. A CNN architecture was used where the input is an I/Q sequence of length 288, followed by two convolutional layers (with ReLu and 2×2 MaxPool) and two dense layers of size 256 and 80. The above CNN models were referred to as RF-W (WiFi) and RF-A (ADS-B) TNN architectures.

6.1.2 Modulation Classification (MC). For modulation classification, the RadioML 2018.01A dataset was used, available for download at http://deepsig.io/datasets. The dataset is an available large modulation dataset, and includes 24 different analog and digital modulations generated with different levels of signal-to-noise ratio (SNR). For consistency, the neural network were considered which present 7 convolutional layers each followed by a MaxPool-2 layer, finally followed by 2 dense layers and 1 softmax layer. The dataset contained 2M examples, each 1024 I/Q samples long. In the following, this model was referred to as the MC TNN architecture.

6.1.3 Data and Model Setup. For each architecture and experiment, two distinct datasets have been extracted for testing and optimization purposes. The optimization set was used to compute the attack strategies $\phi$ as shown in Sections 3 and 4. The computed $\phi$ are then applied to the testing set and then fed to the TNN. To understand the impact of channel conditions, a Rayleigh fading channel was simulated with AWGN noise $h_A$ that affects all waveforms that node A transmits to node R. High and low SNR scenarios were considered with path loss equal to 0 dB and 20 dB, respectively. Moreover, a baseline case with no fading was also considered.

6.1.4 Model Training. To train the neural networks, an $\ell_2$ regularization parameter $\lambda=0.0001$ was used. An Adam optimizer with a learning rate of $l=10^{-4}$ and categorical cross-entropy as a loss function was also used. All architectures were implemented in Keras. The source code used to train the models was available for download at https://github.com/neu-spiral/RFMLS-NEU.

6.2 AML Waveform Jamming (AWJ) Results

In AWJ, the adversary aims at disrupting the accuracy of the TNN by transmitting waveforms of length $N_J$ and of maximum amplitude $\epsilon > 0$, to satisfy Constraint (C2) and keep the energy of the waveform limited. Since $N_J$ might be smaller than the TNN input $N_I$, it is assumed that the adversary periodically transmits the sequence of $N_J$ I/Q samples so that they completely overlap with legitimate waveforms.

Figure 5A:
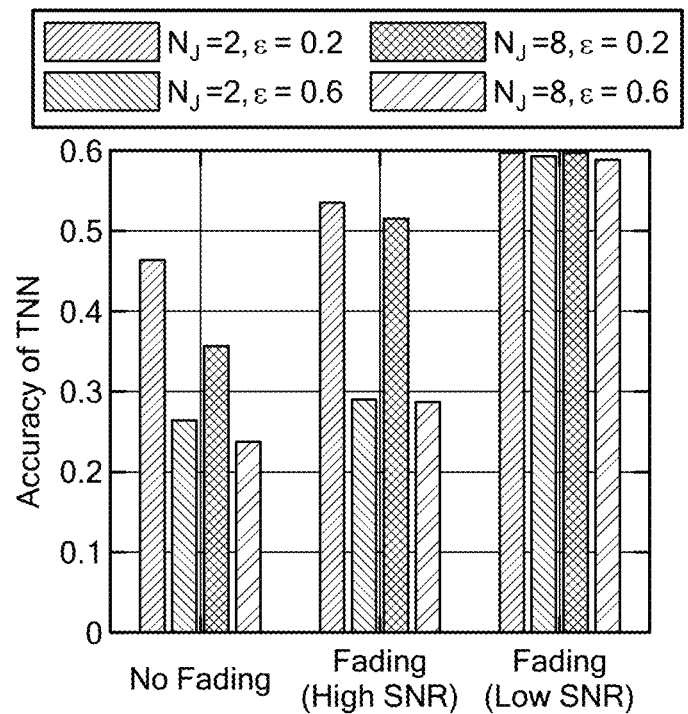
FIGS. 5(a) and 5(b) are graph illustrating accuracy of (a) MC TNN (originally 60%) and (b) RF-W TNN (originally 40%) under the AWJ-U attack for different jamming lengths and e values.

6.2.1 Untargeted AWJ (U-AWJ). FIG. 5(a) shows the accuracy of the MC TNN (original accuracy of 60%) under the AWJ-U attack, for different channel conditions $h_4$, jamming waveform length $N_J$ and $\epsilon$ values. FIG. 5 shows that the adversary always reduces the accuracy of the TNN even when $N_J$ and $\epsilon$ are small. High SNR fading conditions allow the adversary to halve the accuracy of the TNN, while the best performance is achieved in low-fading conditions where the attacker can reduce the accuracy of the TNN by a 3× factor.

Figure 6:
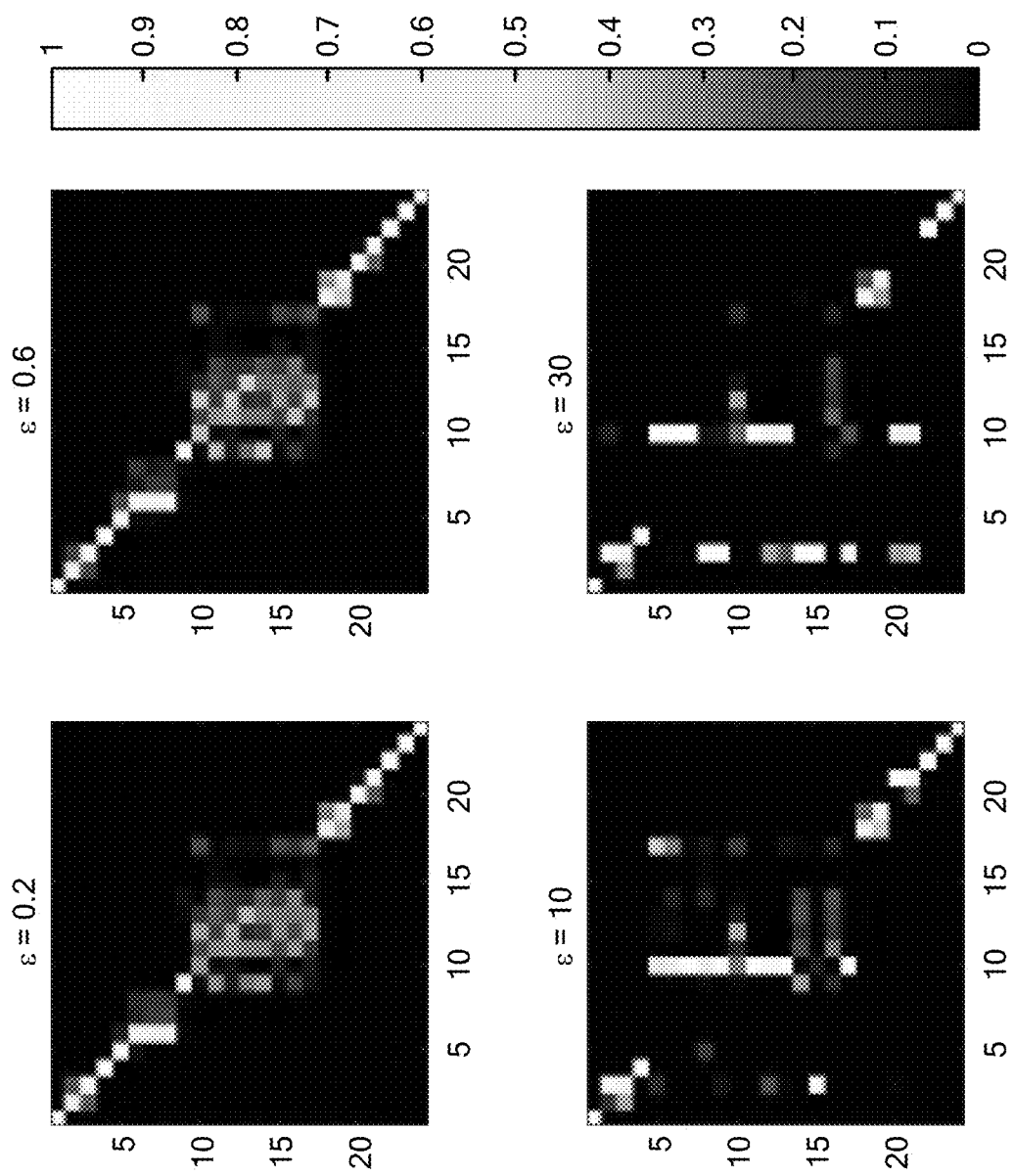
FIG. 6 are illustrations of confusion matrices of MC TNN under the AWJ-U attack in low SNR regime for different $\epsilon$ values.
Figure 7:
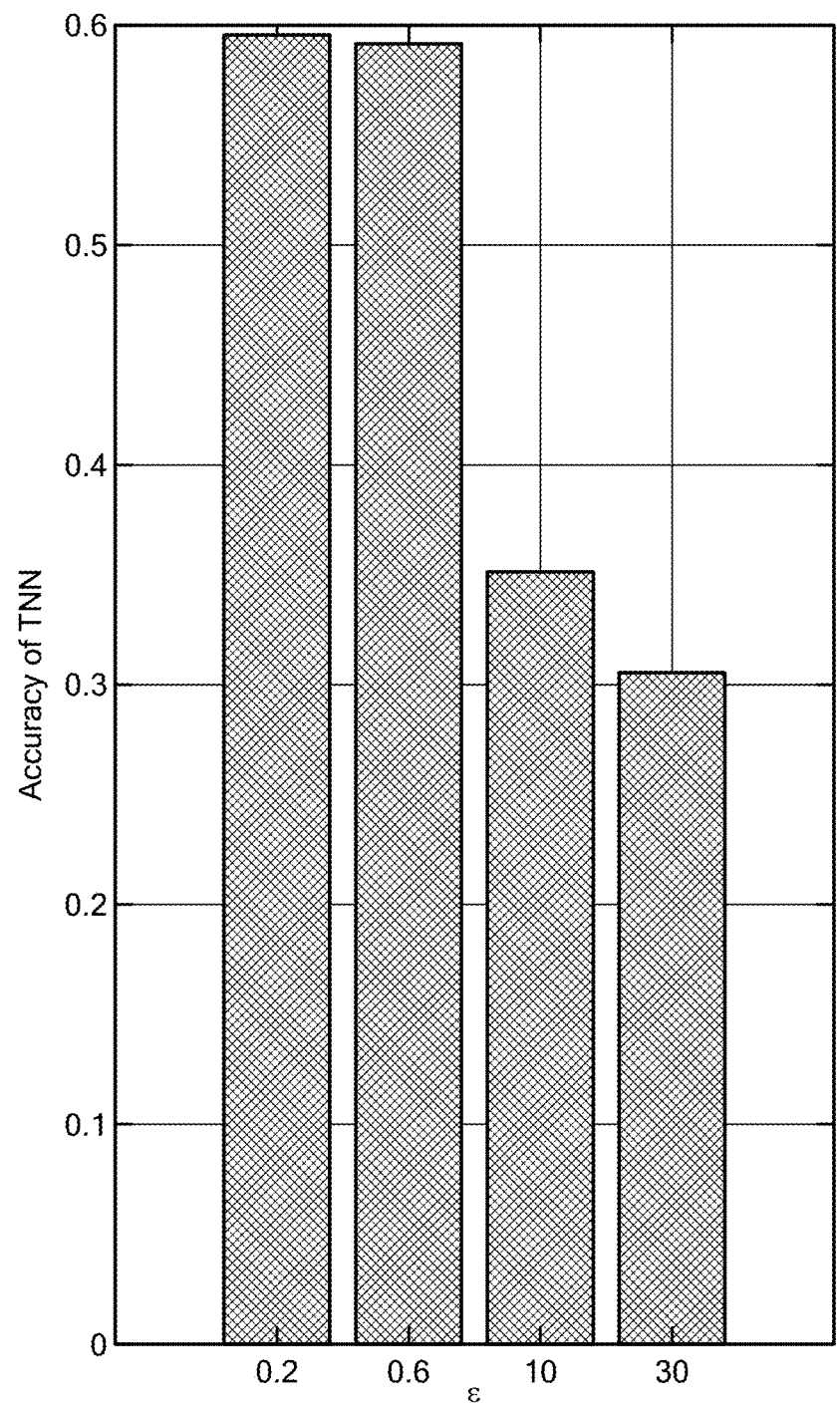
FIG. 7 is a graph of accuracy of MC TNN in FIG. 6 (originally 60%).

FIGS. 6 and 7 show the confusion matrices and the corresponding accuracy levels of the AWJ-U attack to the MC TNN model in the low SNR regime. Here, increasing $\epsilon$ also increases the effectiveness of the attack, demonstrated by the presence of high values outside the main diagonal of the confusion matrix.

Figure 5B:
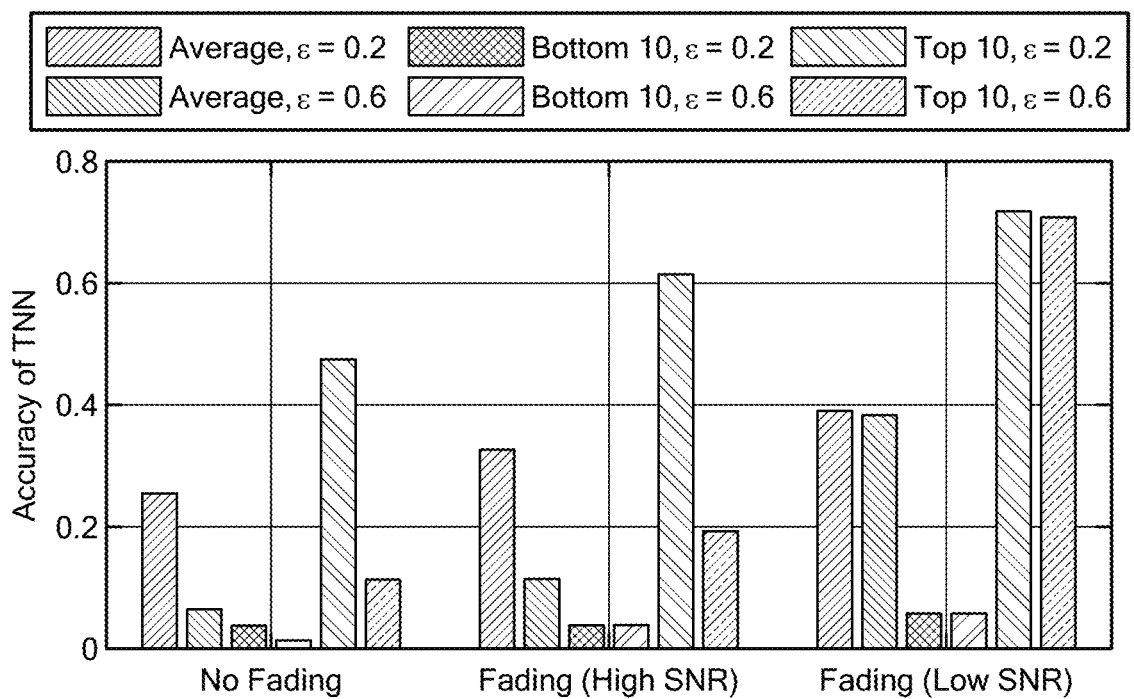

FIG. 5(b) shows the accuracy of the RF-W TNN for different attack strategies, constraints and fading conditions. To better understand the impact of AWJ-U, the 10 least (i.e., Bottom 10) and most (i.e., Top 10) classified devices out of the 500 devices included in the WiFi dataset have been extracted. Interestingly, AWJ-U attacks are extremely effective when targeting the top devices. In some cases, the attacker can drop the accuracy of these devices from 70% to a mere 20% in the high SNR regime. Since the bottom 10 devices are classified with a low accuracy already, it takes minimal effort to alter legitimate waveforms and activate other classes.

Figure 8:
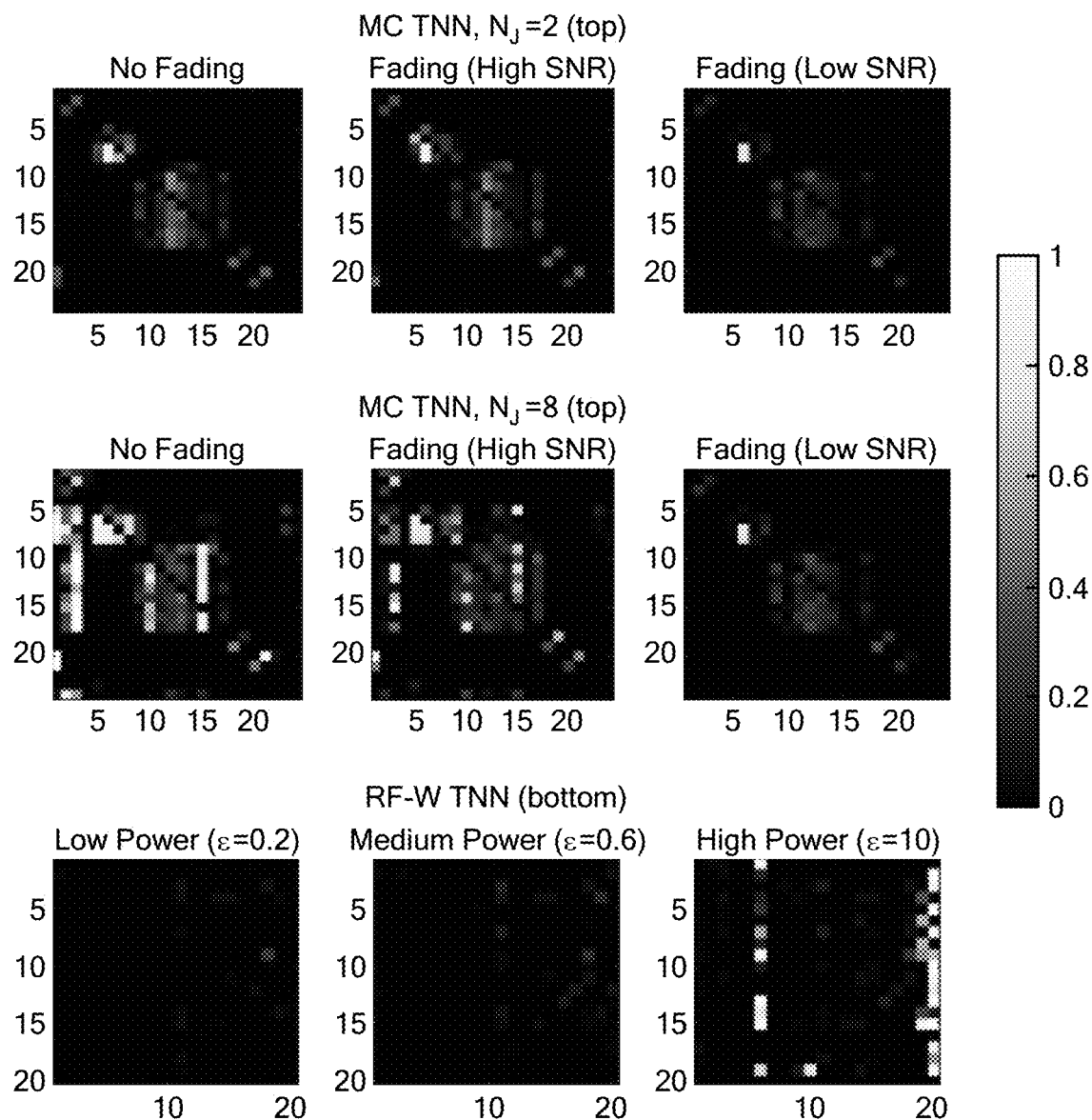
FIG. 8 are graphs illustrating (top) fooling matrix of MC TNN under AWJ-T for different NJ and $\epsilon$ values; (bottom) fooling matrix of RF-W TNN under AWJ-T for different $\epsilon$ values and no fading.

6.2.2 Targeted AWJ (AWJ-T). Compared to untargeted jamming, AWJ-T requires smarter attack strategies as the adversary needs to (i) jam an already transmitted waveform, (ii) hide the underlying features and (iii) mimic those of another class. The top portion of FIG. 8 shows the fooling matrices of AWJ-T attacks against MC TNN. It can be seen that the higher the fooling rate, the more successful the attack was. The adversary was able to effectively target a large set of modulations from 1 to 17 and 24 (i.e., OOK, M-QAM, M-PSK, ASK). However classes from 18-23 (i.e., AM, FM and GMSK) were hard to be targeted and show low fooling rate values. The bottom portion of FIG. 8 shows the results concerning the AWJ-T attack against RF-W TNN. In this case, the adversary achieved higher fooling rates by transmitting with higher energy.

6.3 AML Waveform Synthesis (AWS) Results

The performance of AWS attacks in the case of rogue nodes was evaluated. In this case, the attacker strategy $\phi$ includes M complex-valued FIR taps (Section 3.2) that are convoluted with a baseband waveform $x_{BB}$. To simulate a rogue device, $x_{BB}$ was extracted from the optimization set of the rogue class. This way a rogue class that needs to hide its own features and imitate those of the target classes was effectively emulated.

Figure 9:
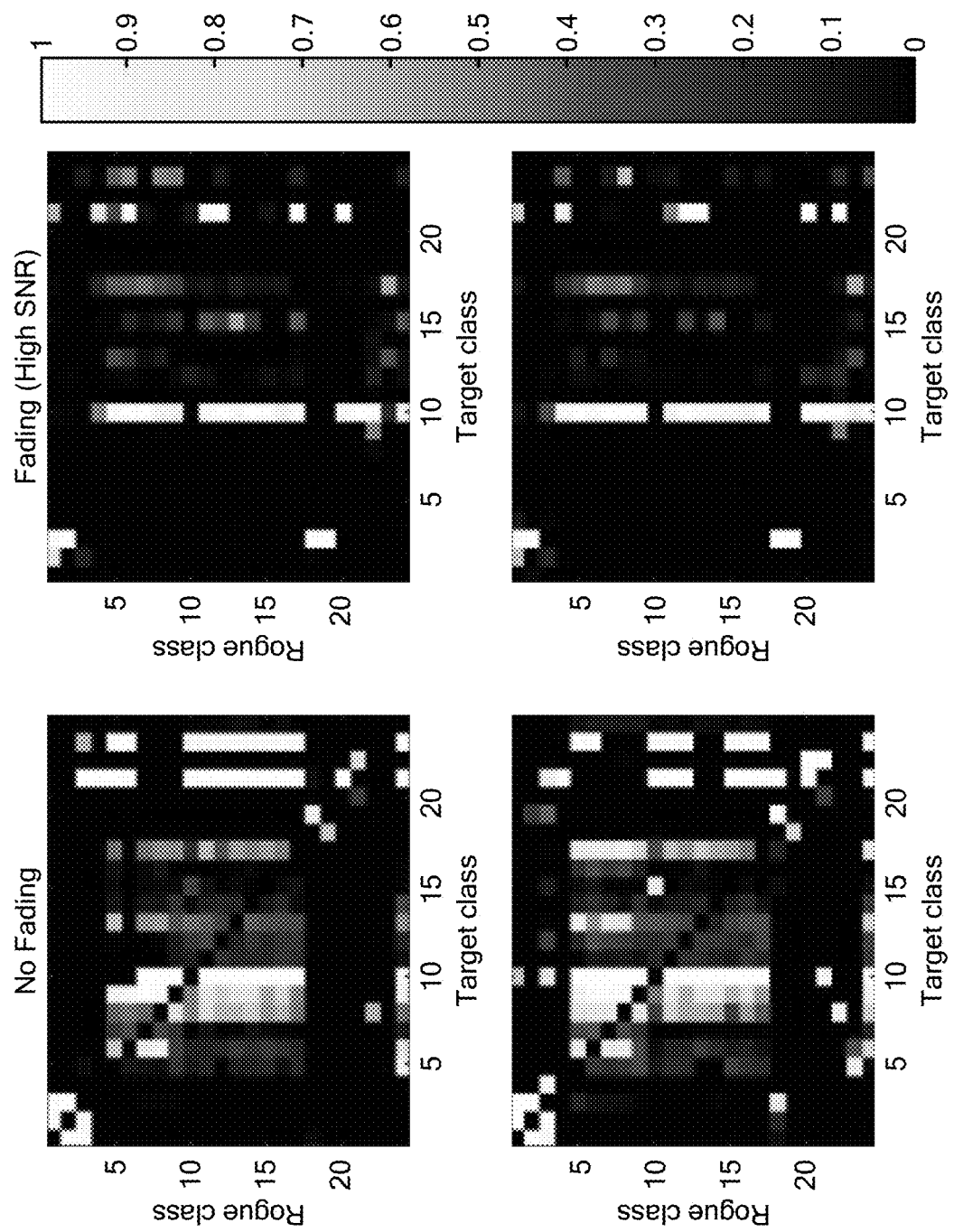
FIG. 9 are graphs illustrating fooling matrix of MC TNN under AWS for different values of M (M=4: top; M=8: bottom).
Figure 10:
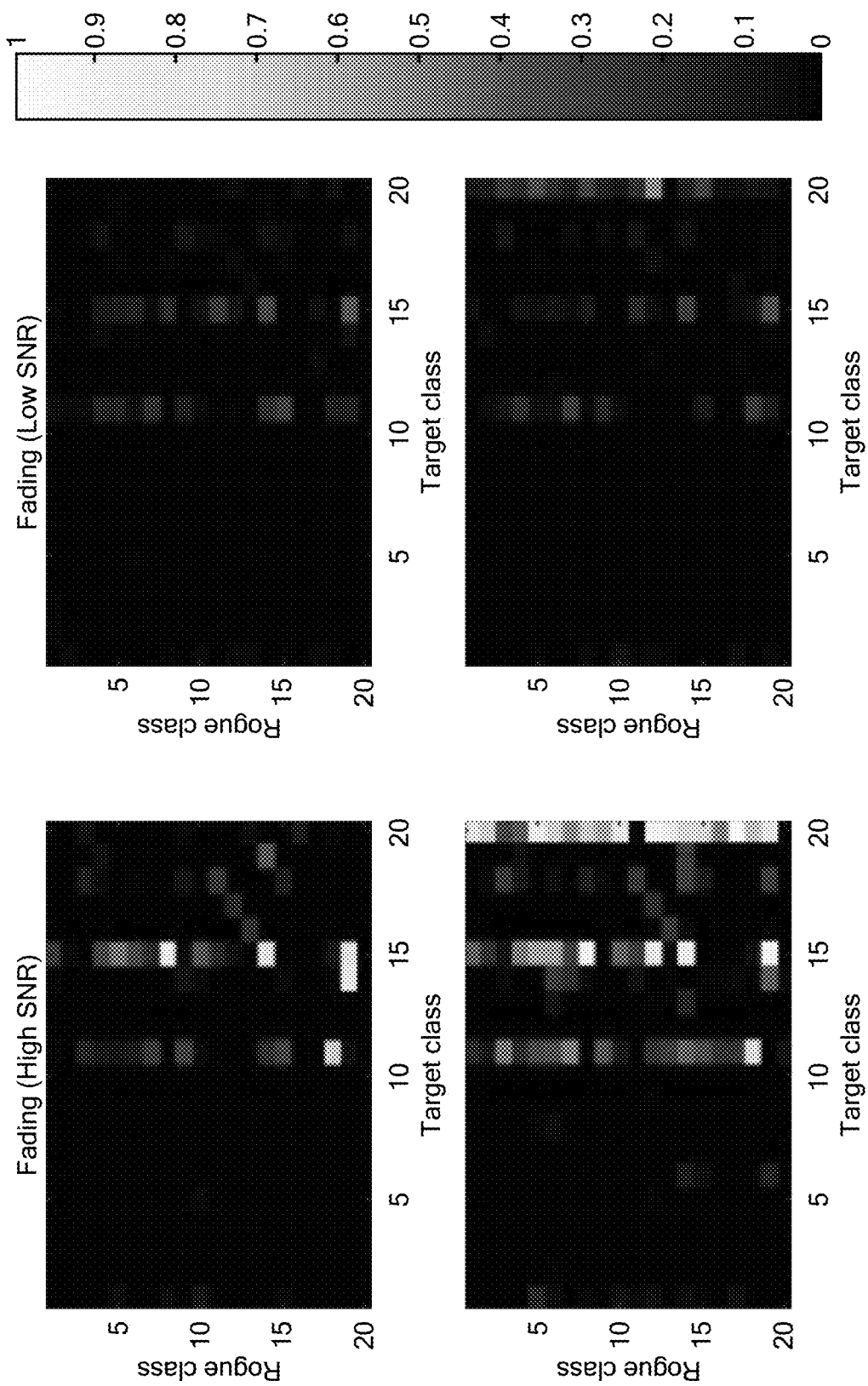
FIG. 10 are graphs illustrating fooling matrix of RF-W TNN under AWS for different values of M (M=4: top; M=8: bottom).

FIG. 9 shows the fooling matrix of AWS attacks against the MC TNN for different channel conditions and values of M when $\epsilon=0.2$. First, note that the main diagonal shows close-to-zero accuracy, meaning that the attacker can successfully hide its own features. Second, in the no-fading regime, rogue classes can effectively imitate a large set of target classes. FIG. 10 depicts the fooling matrices of AWS attacks against the RF-W TNN. In can be noticed that (i) increasing the number of FIR taps increased the fooling rate; and (ii) the bottom classes (1-10) were the ones that the attacker was not able to imitate. However, the same did not hold for the top 10 classes (11 to 20), which were imitated with high probability (i.e., 28%, 35%, 62% for classes 11, 15, 20, respectively). FIG. 10 shows that the attacker was unlikely to attack those classes that are misclassified by the TNN.

Figure 11:
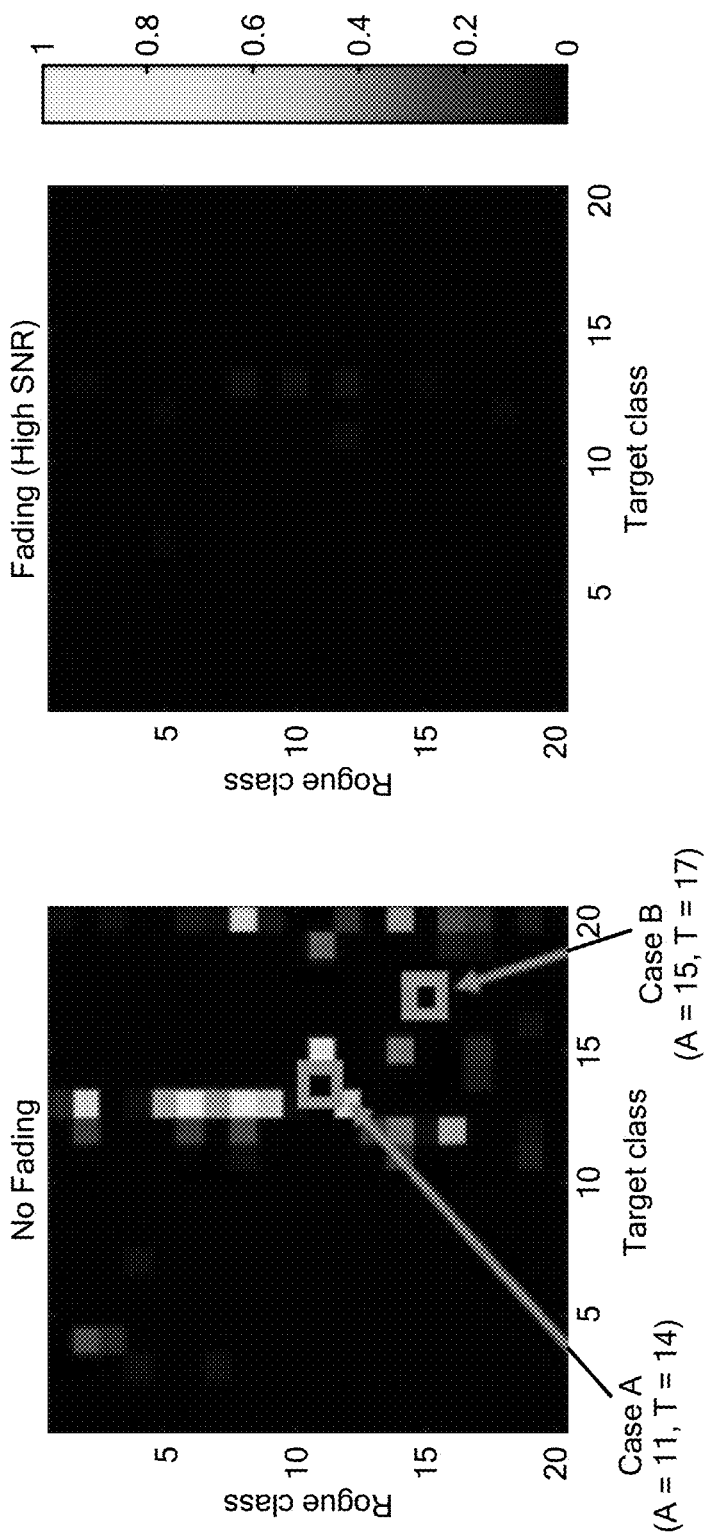
FIG. 11 are graphs illustrating fooling matrix of RF-A (original accuracy 60%) TNN under AWS with M=4 and $\epsilon=0.5$ FIG. 12 are graphs illustrating a comparison of waveforms generated through AWS attacks to RF-A TNN.

The same behavior was also exhibited by the RF-A TNN. FIG. 11 shows the fooling matrix when $\epsilon=0.5$ and M=4. The results show that the attacker was not able to properly imitate classes 1-10 (i.e., the bottom classes). Classes 11-20 (i.e., the top classes) were instead imitated to some extent. This is because it is unlikely that a unique setup of $\epsilon$ and M will work for all classes (both rogue and target).

Figure 12:
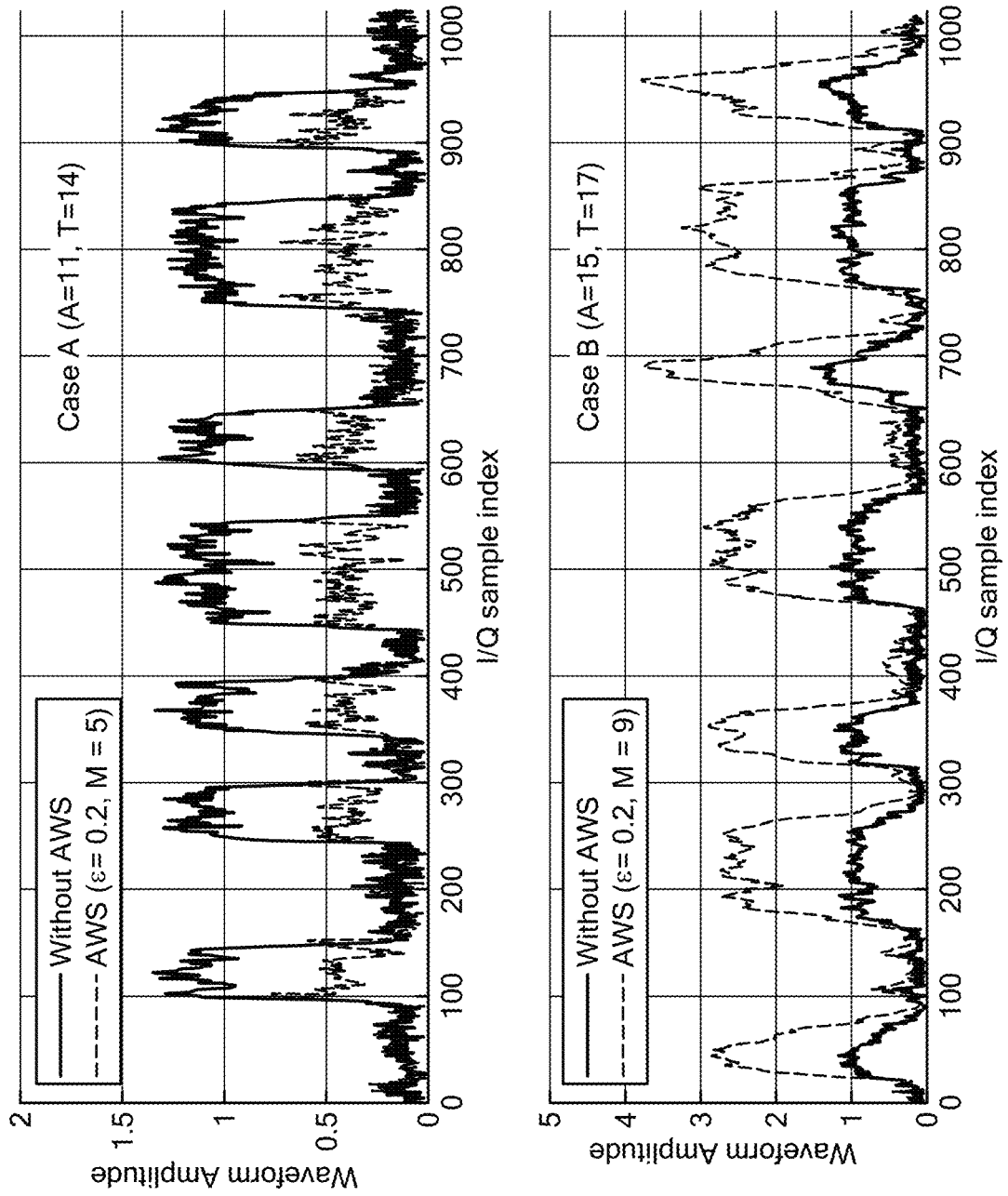

To further demonstrate this point, FIG. 12 shows how rogue classes can actually imitate other classes by utilizing different values of M and $\epsilon$. Two cases were defined: Case A, where A=11 and T=14, and Case B, where A=15 and T=17. As shown in FIG. 11, Case A and Case B both yielded low fooling rate when M=4 and $\epsilon=0.5$. FIG. 12 shows two ADS-B waveforms generated through AWS attacks in Case A and Case B, where solid lines show the original waveform transmitted by the rogue node without any modification in Case A and Case B. At first, the unmodified blue waveforms were classified by the RF-A TNN as belonging to the rogue class (11 and 15, respectively) with probabilities 97% and 88%. However, by applying AWS with different M and $\epsilon$ parameters than the ones in FIG. 11, the adversary was successful in imitating the target class in both Case A and Case B by increasing the activation probability to 20% and 28%, which are considerably larger than the activation probability of all other 500 classes in the dataset. This demonstrates that the choice of M and $\epsilon$ was important to the success of the AWS.

Finally, the waveforms in FIG. 12 give insights on how AWS actually operates. In can be seen that the phase of the waveforms did not change significantly, conversely from the amplitude. Since ADS-B used an on-off keying (OOK) modulation, it was verified that the modifications made by the waveform did not increase the BER of those transmissions. Moreover, FIG. 12 shows that AWS attempted to change the path loss between A and R, as the amplitude respectively increased and decreased in Case A and Case B.

6.4 Neural Network Technology (WaveNet) Testbed Results

The neural network technology was evaluated on a software-defined radio (SDR) testbed composed by 64 omnidirectional antennas through 100 ft coaxial cables. Antennas were hung off the ceiling of a 2240 ft$^2$ office space and operated in the 2.4-2.5 and 4.9-5.9 GHz frequency bands.

To evaluate the performance of the neural network technology in a challenging black-box scenario, the targeted external Adversarial Waveform Synthesis (AWS) attack was implemented to a neural network used to fingerprint 5 nominally-identical USRP N210 radios transmitting an identical WiFi baseband signal. This was the worst-case scenario for an adversary since the neural network technology had to learn the impairments to fool the neural network. The receiver SDR sampled the incoming signals at 20 MS/s and equalized it using WiFi pilots and training sequences. The resulting data was used to train a TNN, which took as input 6 equalized OFDM symbols, thus 48*6=288 I/Q samples. It was composed by two 1D Conv/ReLU with dropout rate of 0.5 and 50 filters of size 1×7 and 2×7, respectively. The output was then fed to two dense layers of 256, and 80 neurons, respectively. The network was trained using the procedure in Section 6.1.4. The resulting confusion matrix of the classifier, which obtains 59% accuracy, is shown in FIG. 1(a).

The neural network was trained using baseband WiFi I/Q samples, thus without any impairment, with 1 FIRLayer and with a batch of 100 slices. FIG. 13(*a*) shows that when $\epsilon$ had a low value of 0.1, the neural network-generated I/Q sequences always collapsed onto a single class, and therefore was not able to hack the TNNs. However, FIG. 13(*b*) shows that when $\epsilon$ increased to 1, the fooling rate jumped to 79%, which further increased to 97% with 20 FIR taps and $\epsilon$=10, improving by over 60% with respect to the replay attack that could achieve only 30% fooling rate as shown in FIG. 1(*c*).

Figure 14B:
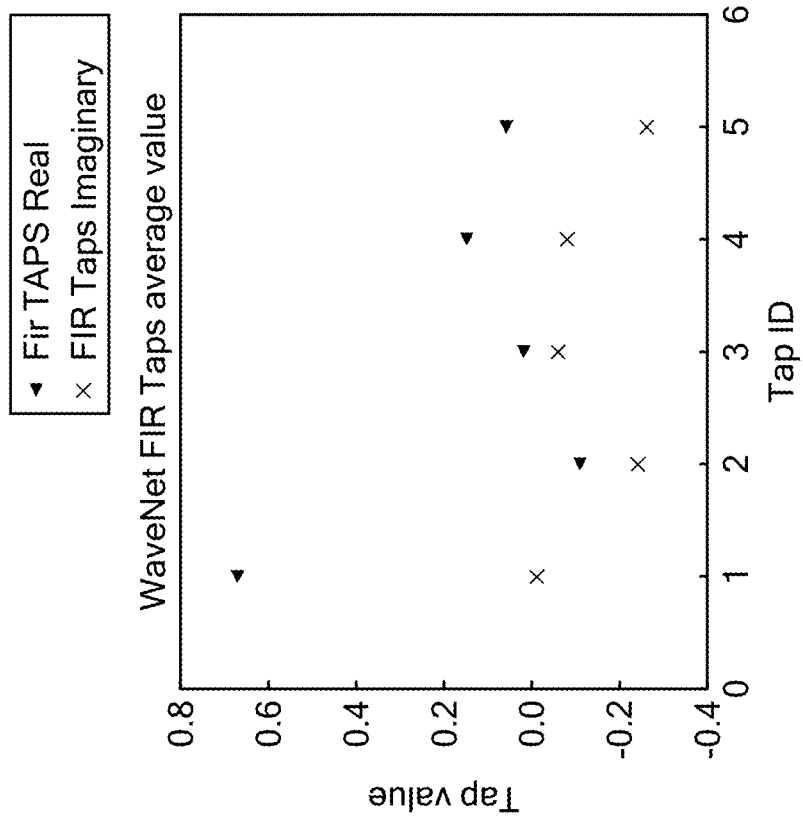
FIGS. 14(a)-14(b) are graphs illustrating I/Q displacement and average FIR taps.
Figure 14A:
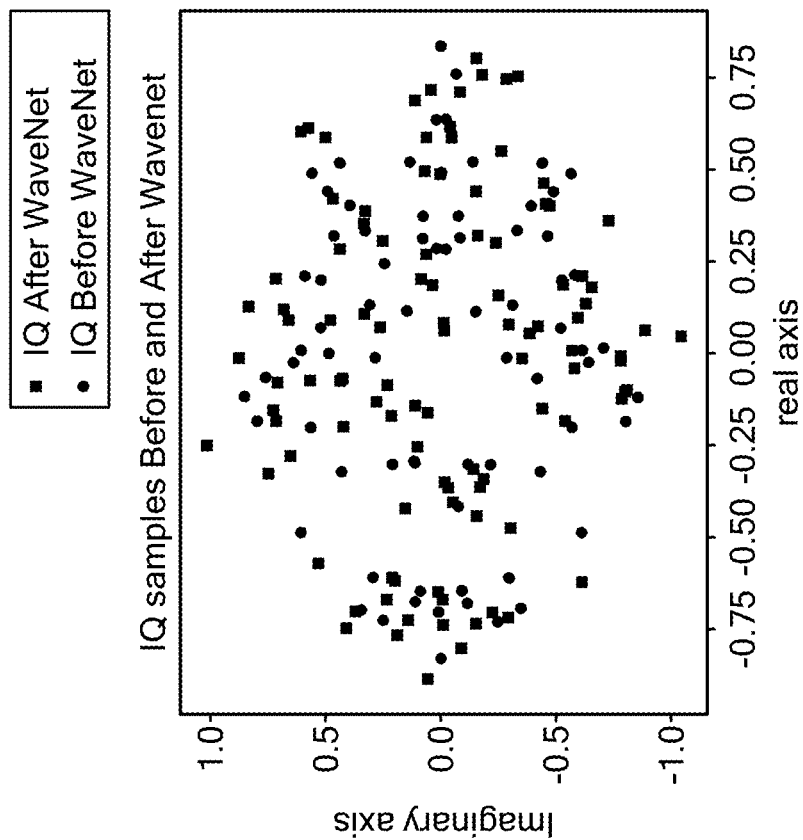

Finally, FIGS. 14(*a*) and (*b*) show respectively the displacement caused by the neural network on an input slice with $\epsilon$=10 and the average values of the 5 FIR taps obtained after training. The remaining 15 taps were not plotted, since they are very close to zero. It can be seen that the distortion imposed to the I/Q samples was kept to a minimum, which was confirmed by the average FIR tap value which remained always below one.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method of determining a response of a target wireless communication system to an adversarial attack, comprising:
   (a) providing, at an adversarial node, an adversarial processing unit operative to generate adversarial signals to confuse the target wireless communication system, wherein:
      the target wireless communication system includes a target neural network operative to classify incoming waveforms of incoming signals received from a plurality of transmitters, and
      the adversarial signals are based on an attack strategy comprising generating the adversarial signals with waveforms that cause the target neural network to misclassify legitimate signals;
   (b) transmitting the legitimate signals from one or more legitimate transmission nodes to the target wireless communication system;
   (c) transmitting the adversarial signals from the adversarial node to the target wireless communication system during transmission of the legitimate signals; and
   (d) determining an accuracy of classification of the legitimate signals by the target neural network.

2. The method of claim 1, wherein the adversarial processing unit is operative to superimpose a generated waveform on a legitimate waveform to cause a displacement of I/Q samples produced from ongoing transmissions from the legitimate nodes to jam the legitimate signals.

3. The method of claim 1, further comprising transmitting the adversarial signals in a sequence of I/Q samples of a waveform length that overlaps a waveform length of legitimate waveforms.

4. The method of claim 1, wherein the attack strategy of the adversarial processing unit comprises minimizing activation probability functions of a class of the legitimate signals and a class of the adversarial signals over a set of consecutive waveforms generated for superimposition on a plurality of legitimate waveforms and based on one or more constraints, the constraints including one or more of minimizing energy of the adversarial signals and minimizing a bit error rate of the adversarial signals.

5. The method of claim 1, wherein the attack strategy of the adversarial processing unit comprises maximizing activation probability functions of a target class of the target neural network while minimizing activation probability functions of a class of the legitimate signals and a class of the adversarial signals over a set of consecutive waveforms generated for superimposition on a plurality of legitimate waveforms and based on one or more constraints, the constraints including one or more of minimizing energy of the adversarial signals and minimizing a bit error rate of the adversarial signals.

6. The method of claim 1, wherein the attack strategy of the adversarial processing unit comprises maximizing activation probability functions of a target class of the target neural network while minimizing activation probability functions of a class of the adversarial signals over a set of consecutive waveforms and based on one or more constraints, the constraints including one or more of minimizing energy of the adversarial signals and minimizing a bit error rate of the adversarial signals.

7. The method of claim 1, wherein the attack strategy of the adversarial processing unit comprises generating synthetic adversarial waveforms using selected baseband waveforms convoluted with finite impulse response filter taps.

8. The method of claim 1, wherein the attack strategy of the adversarial processing unit comprises maximizing activation probability functions for a set of classes, the set of classes comprising one or more legitimate classes, one or more target classes, and one or more adversarial classes, over a set of consecutive waveforms, each of the activation probability functions multiplied by a constant $\omega_c$ selected from −1, 0, and 1, depending on the attack strategy.

9. The method of claim 8, wherein, for the adversarial classes, when the adversarial node is a rogue node separate from a set of nodes including the legitimate transmission nodes, $\omega_c$=+1 or −1, and when the adversarial node is a node external to the set of nodes including the legitimate transmission nodes, $\omega_c$=0.

10. The method of claim 8, wherein the attack strategy is further based on one or more constraints, the constraints including minimizing energy of the adversarial signals and minimizing a bit error rate of the adversarial signals.

11. The method of claim 1, wherein the adversarial processing unit is operative to determine the adversarial attack strategy based on knowledge of activation probability functions and gradients of the target neural network, wherein gradients of activation probability functions of a class of the target neural network are determined with respect to the attack strategy.

12. The method of claim 1, wherein the adversarial processing unit is operative to query the output of the target wireless communication system network to determine a classification label to use for the adversarial waveform.

13. The method of claim 1, wherein the adversarial processing unit includes an adversarial neural network including a plurality of finite impulse response layers, and is further operative to input waveforms of the adversarial signals and a target class to the adversarial neural network.

14. The method of claim 1, wherein the adversarial processing unit comprises:
   a trained discriminator operative to provide outputs comprising waveforms imitating legitimate transmitter devices that transmit to the target wireless communication system, and
   a generator comprising a deep learning neural network including a plurality of neural network layers, the neural network layers including a plurality of finite impulse response layers, the generator operative to receive training inputs comprising the outputs from the trained discriminator and selected baseband waveforms, and to produce a training output comprising waveforms for a target class of waveforms of the target network.

15. The method of claim 1, wherein determining the accuracy of the trained neural network of the target wireless communication system comprises determining a confusion matrix of the incoming signals.

16. A neural network training system for use with a target wireless communication system, the target wireless communication system including a target neural network operative to classify incoming waveforms of incoming signals received from a plurality of transmitters, the training system comprising:
   a radio frequency (RF) receiver operative to query waveforms from a target network and a transmitter operative to transmit signals to a receiver of the target network;
   an adversarial processing unit comprising:
      a trained discriminator operative to provide outputs comprising waveforms imitating legitimate transmitter devices of the target network, and
      a generator comprising a deep learning neural network including a plurality of neural network layers, the neural network layers including a plurality of finite impulse response layers, the generator operative to receive training inputs comprising the outputs from the trained discriminator and selected baseband waveforms, and to produce a training output comprising waveforms for a target class of waveforms of the target network,
   wherein the adversarial processing unit is further operative to transmit the waveforms of the training output to the receiver of the target network.

17. The system of claim 1, wherein a first layer of the finite impulse response layers is weighted to return unchanged input values.

18. The system of claim 1, wherein the adversarial processing unit is operative to constrain waveform components at each finite impulse response layer within selected bounds.

19. The system of claim 1, wherein the adversarial processing unit is operative to assign a label to each waveform of a batch of the selected baseband waveform prior to inputting the selected baseband waveforms to the generator.

20. The system of claim 1, wherein the adversarial processing unit is operative to query the target network to determine a softmax output comprising a normalization of the output of the target neural network to a probability distribution over predicted output classes from the target neural network and to weight the finite impulse response layers to minimize losses based on the softmax output.

21. A method of training an adversarial neural network for use with a target wireless communication system, the target wireless communication system including a target neural network operative to classify incoming waveforms of incoming signals received from a plurality of transmitters comprising:
   (a) providing an adversarial processing unit comprising:
      a trained discriminator operative to provide outputs comprising waveforms imitating legitimate transmitter devices of the target network, and
      a generator comprising a deep learning neural network including a plurality of neural network layers, the neural network layers including a plurality of finite impulse response layers, the generator operative to receive training inputs comprising the outputs from the trained discriminator and selected baseband waveforms, and to produce a training output comprising waveforms for a target class of waveforms of the target network;
   (b) generating a waveform training batch based on a protocol of the target network;
   (c) assigning an embedded label to each waveform in the training batch;
   (c) inputting the training batch to the deep learning neural network;
   (e) outputting a training output from the deep learning neural network; and
   (f) transmitting waveforms in the training output to the target network.

* * * * *